(12) United States Patent
Ouchi et al.

(10) Patent No.: US 12,730,432 B2
(45) Date of Patent: Sep. 8, 2026

(54) OPERATION PANEL AND MACHINE TOOL

(71) Applicant: DMG MORI CO., LTD., Nara (JP)

(72) Inventors: Toshinori Ouchi, Hokkaido (JP); Sumihiro Kiyota, Nara (JP); Makoto Ideue, Nara (JP); Yusaku Nishimiya, Hokkaido (JP); Kazunari Kakiseko, Hokkaido (JP)

(73) Assignee: DMG MORI CO., LTD., Nara (JP)

( * ) Notice: Subject to any disclaimer, the term of this patent is extended or adjusted under 35 U.S.C. 154(b) by 222 days.

(21) Appl. No.: 18/038,395

(22) PCT Filed: Apr. 4, 2022

(86) PCT No.: PCT/JP2022/017034
§ 371 (c)(1),
(2) Date: May 23, 2023

(87) PCT Pub. No.: WO2022/215677
PCT Pub. Date: Oct. 13, 2022

(65) Prior Publication Data

US 2024/0094706 A1 Mar. 21, 2024

(30) Foreign Application Priority Data

Apr. 5, 2021 (JP) ................................ 2021-063854

(51) Int. Cl.
*G05B 19/414* (2006.01)

(52) U.S. Cl.
CPC .. *G05B 19/414* (2013.01); *G05B 2219/36169* (2013.01)

(58) Field of Classification Search
CPC ........ G05B 19/414; G05B 2219/36169; G05B 2219/36009; G05B 2219/36129; G05B 2219/36137; G05B 2219/36168; G05B 19/409
See application file for complete search history.

(56) References Cited

U.S. PATENT DOCUMENTS 10,152,044 B2 * 12/2018 Ono .................... G05B 19/409
11,243,676 B2 * 2/2022 Fujitsuka ............ G06F 3/04886
2010/0138031 A1 6/2010 Welferi et al.
(Continued)

FOREIGN PATENT DOCUMENTS

CN 109311206 A 2/2019
EP 3203336 A1 8/2017
(Continued)

OTHER PUBLICATIONS

International Search Report issued for PCT/JP2022/017034 on Jun. 14, 2022.

*Primary Examiner* — Christopher E. Everett
(74) *Attorney, Agent, or Firm* — IP Business Solutions, LLC

(57) ABSTRACT

An operation panel for operating a machine tool includes a first display unit for displaying information related to the machine tool, a keyboard, and a plurality of buttons. The button includes a second display unit and a transparent cover. The second display unit displays a first key image indicating a first function and is able to be switched to display a second key image indicating a second function depending on an application screen displayed on the first display unit.

9 Claims, 25 Drawing Sheets

(56) References Cited

U.S. PATENT DOCUMENTS

| | | | | |
|---|---|---|---|---|
| 2013/0257738 | A1 | 10/2013 | Tanaka | |
| 2013/0338815 | A1* | 12/2013 | Ogawa | G05B 19/18 700/180 |
| 2015/0082223 | A1 | 3/2015 | Kiyota et al. | |
| 2016/0117090 | A1* | 4/2016 | Fujitsuka | G06F 3/0482 715/765 |
| 2017/0031345 | A1* | 2/2017 | Ono | G05B 19/409 |
| 2017/0300035 | A1* | 10/2017 | Kawai | G05B 19/409 |
| 2019/0034025 | A1 | 1/2019 | Izumi et al. | |
| 2019/0358879 | A1 | 11/2019 | Taruya et al. | |

FOREIGN PATENT DOCUMENTS

| | | | |
|---|---|---|---|
| JP | 2000-000738 | A | 1/2000 |
| JP | 2002-055702 | A | 2/2002 |
| JP | 2006-301733 | A | 11/2006 |
| JP | 2015-211883 | A | 11/2015 |
| WO | 2012073368 | A1 | 6/2012 |

* cited by examiner 110a
110b
110c
110d
110e
110f
110g
110h
110i
110j
110k
110l
110m
110n
110o
110p
110q
110r
110s
110t
110u
110v
110w
110x
01
112a
112b
112c
112d
112e
112f
112g
112h
112i
112j
112k
112l

| FUNCTION BUTTON ID | REFERENCE POSITION COORDINATE |
|---|---|
| FB01 | (X1:Y1) |
| FB02 | (X1:Y2) |
| FB03 | (X2:Y1) |
| FB04 | (X2:Y2) |
| ⋮ | ⋮ |
| FB23 | (X12:Y1) |
| FB24 | (X12:Y2) |

| FUNCTION | RELEVANT KEYWORD | NUMBER OF TIMES OF USE |
|---|---|---|
| PSM (PRESETTER MODE (ON/OFF)) | MEASUREMENT, TOOL, OFFSET, SHAPE, FRICTION | 52 |
| TURRET- (TURRET TURNING (-)) | TOOL, INDEXING, INTERFERENCE | 192 |
| TURRET+ (TURRET TURNING (+)) | TOOL, INDEXING, INTERFERENCE | 131 |
| SP+ (SPINDLE ROTATION (+)) | SPINDLE MOVEMENT, FAST-FORWARDING, INTERFERENCE | 590 |
| SP- (SPINDLE ROTATION (-)) | SPINDLE MOVEMENT, FAST-FORWARDING, INTERFERENCE | 582 |
| ⋮ | ⋮ | ⋮ |

| TYPE OF APPLICATION SCREEN | RELEVANT KEYWORD |
|---|---|
| TOOL OFFSET SCREEN | TOOL, OFFSET, SHAPE, WEAR, MEASUREMENT, INTERFERENCE |
| WORKPIECE OFFSET SCREEN | WORKPIECE, OFFSET, MEASUREMENT |
| ⋮ | ⋮ |

Figure 23:
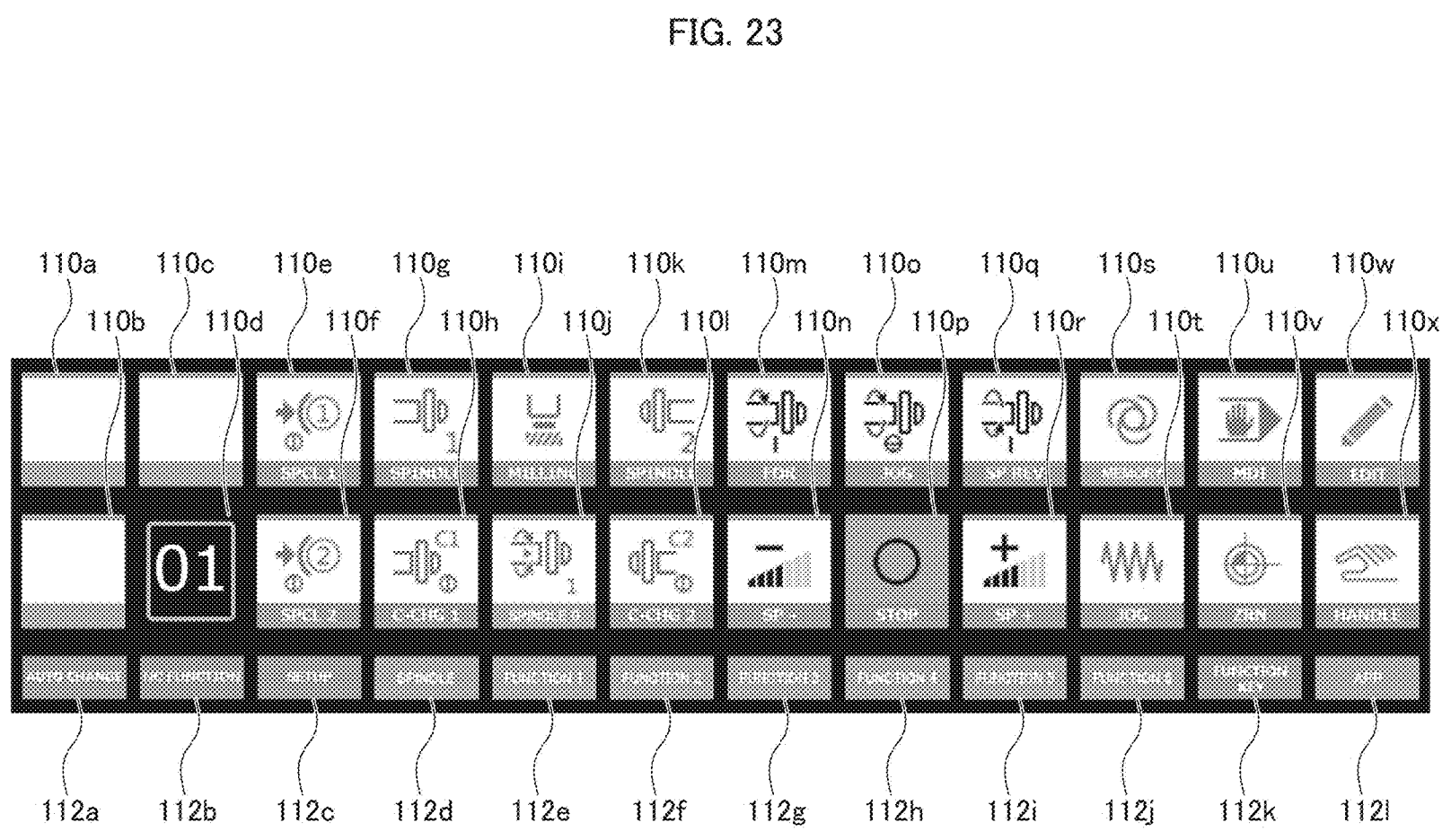

OPERATION PANEL AND MACHINE TOOL

TECHNICAL FIELD

The present invention relates to an operation panel and a machine tool.

BACKGROUND ART

Machine tools can perform various types of machining including automatic operation in accordance with an NC program. In this connection, applications for editing and running the NC program are also used. Accordingly, the number of functions implemented by the machine tools or the applications is large, and an operation by a user associated with the functions tends to be complicated. The operation by the user is performed on an operation panel provided in the machine tool.

For example, operations related to these functions can be accepted by means of a keyboard on the operation panel. Further, if function icons are displayed on a touch panel of the operation panel, many functions can be activated by one touch.

CITATION LIST

Patent Literature

PTL 1: JP 2002-055702 A
PTL 2: JP 2000-000738 A

SUMMARY OF INVENTION

Technical Problem

However, in order to selectively use the various functions by means of the keyboard, an operation procedure becomes complicated. Although it is also possible to assign any function to a function key on the keyboard, the number of function keys is limited and therefore available functions are few.

Further, in the method of displaying the function icons on the touch panel, it is necessary to operate the touch panel while looking at the touch panel to avoid a touch error, and therefore usability is poor. In addition, the response of the touch panel is not necessarily good, and it may be difficult to activate a desired function at an intended timing.

Solution to Problem

Accordingly, the present invention provides an operation panel, a machine tool, and the like described in the claims.

General and specific aspects of the operation panel, the machine tool, and the like may be realized by systems, methods, and computer programs, as well as a combination thereof.

Advantageous Effects of Invention

According to the present invention, a user operation on an operation panel of a machine tool can be simplified.

BRIEF DESCRIPTION OF DRAWINGS

FIG. 9 is a diagram illustrating a display example of a key arrangement for workpiece offset screen.

FIG. 13 is a data structure diagram of a button position memory.

FIG. 20 is a data structure diagram of a use history memory.

FIG. 21 is a data structure diagram of a screen keyword memory.

FIG. 23 is a diagram illustrating a display example of a key arrangement for SPINDLE.

DESCRIPTION OF EMBODIMENTS

An operation panel and a machine tool according to an embodiment will be explained below with reference to the drawings. In the following descriptions, like constituents are denoted by like reference signs and explanations thereof are omitted.

Embodiment

Figure 1:
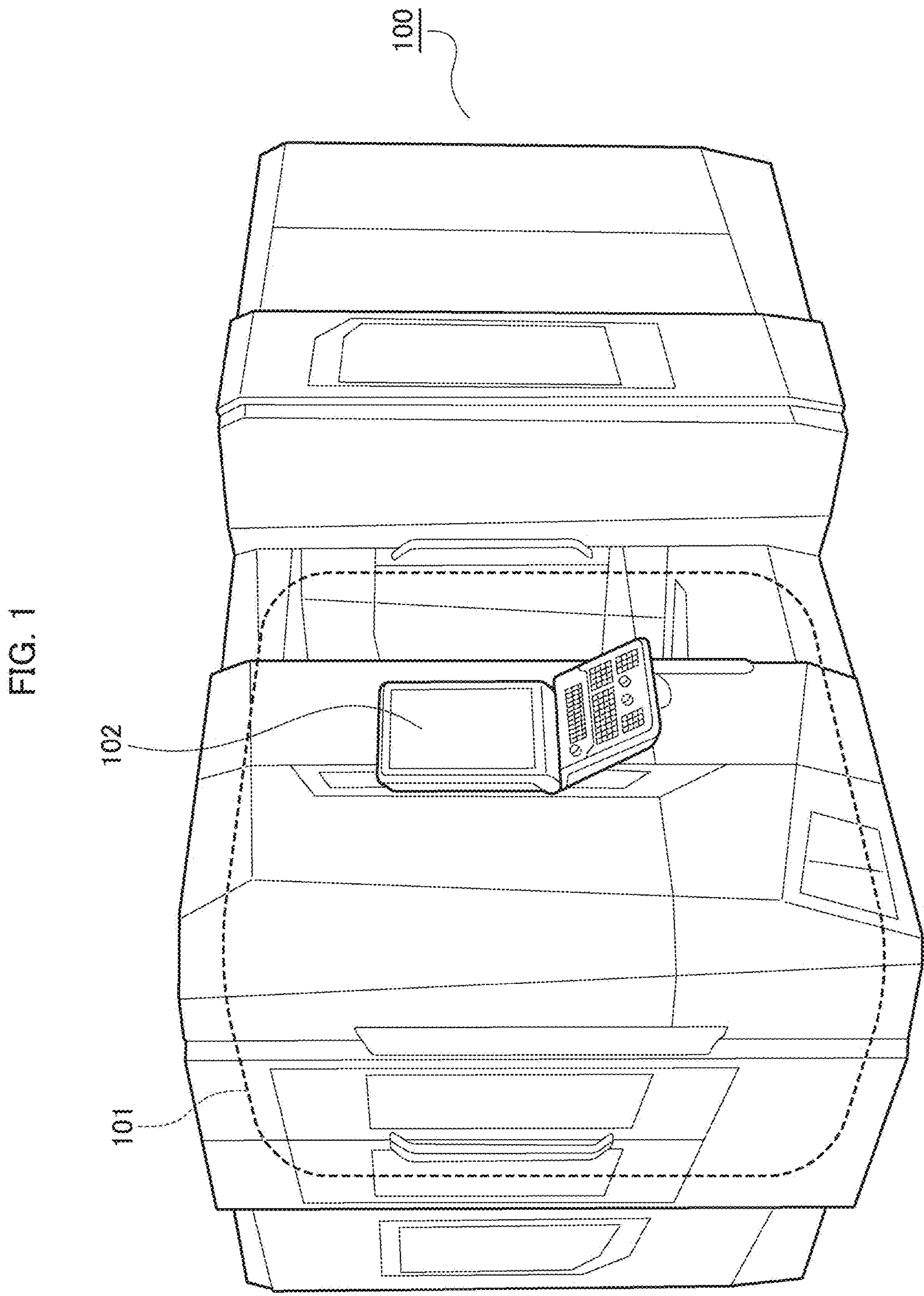
FIG. 1 is an external view of a machine tool.

FIG. 1 is an external view of a machine tool 100.

The machine tool 100 cuts or grinds a workpiece made of metal or the like as a machining object to machine the workpiece into a desired shape. Further, the machine tool 100 includes a numerical control device (an NC device) and can be automatically operated by an NC program. The machine tool 100 includes a machining unit. In a case where the machine tool is a turning center, the machining unit of the turning center includes a rotary shaft, a servo motor, a turret, and the like and mainly performs turning. In a case where the machine tool is a machining center, the machining unit of the machining center includes a spindle, a servo motor, a pallet, an ATC, a tool magazine, and the like and performs milling, boring, drilling, tapping, and the like. The machining unit is placed in a machining area 101. The machine tool 100 is provided with an operation panel 102. The operation panel 102 is used for a user operation and further causes an application related to the machine tool 100 (for example, an NC program editing application and an NC program running application) to be run. When a user presses a machining start button on the operation panel 102, the machining unit starts machining. The machine tool may be a machine other than a turning center or a machining center, such as a combined machine.

Figure 2:
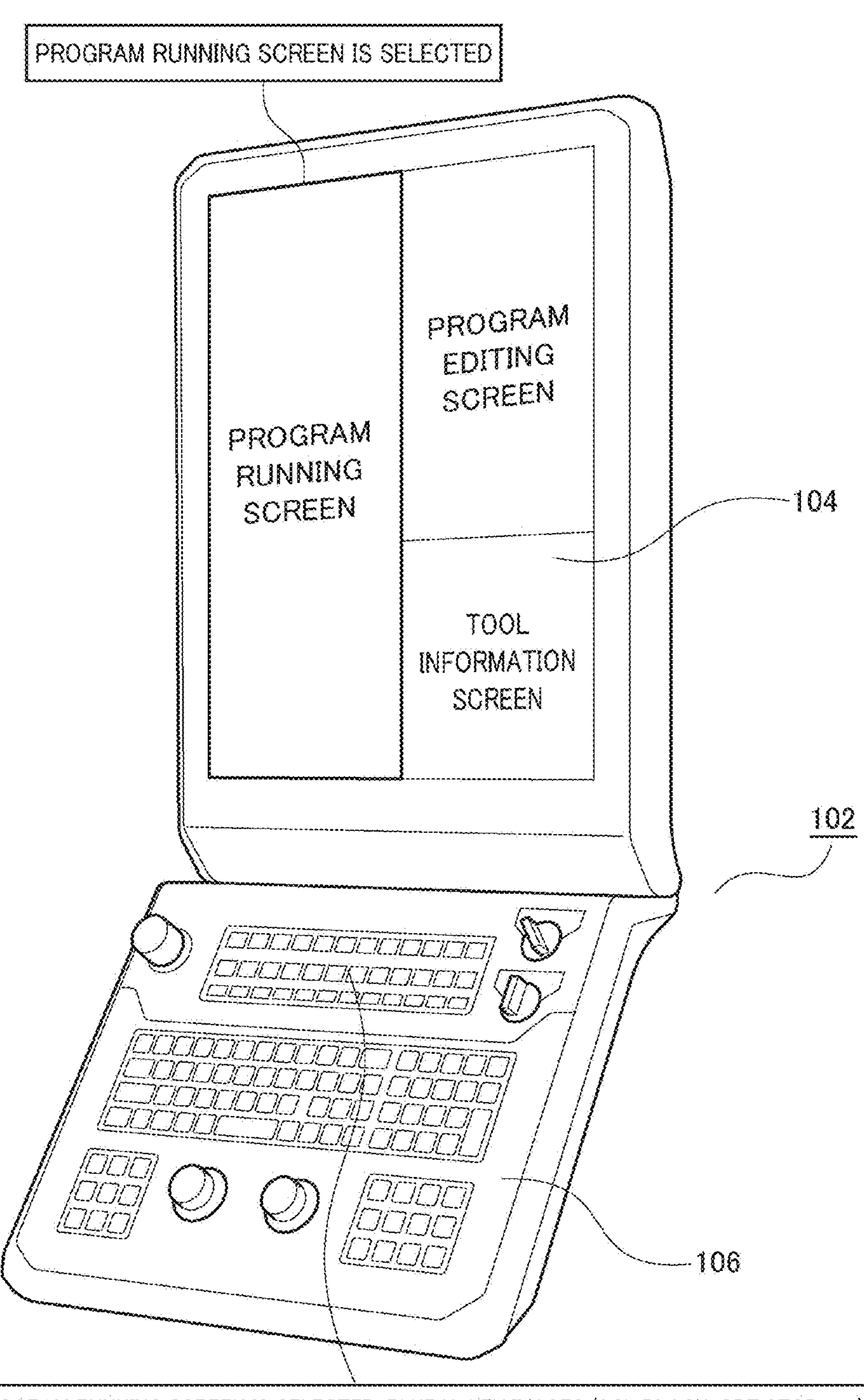
FIG. 2 is an external view of an operation panel.

FIG. 2 is an external view of the operation panel 102.

The operation panel 102 includes a first display unit 104 in an upper portion and an operation panel 106 in a lower portion. For example, a touch panel including a liquid crystal display and a touch sensor is used as the first display unit 104. The touch panel serves as both the first display unit 104 and a touch operation accepting device. Information related to the machine tool 100, for example, an application screen is displayed on the first display unit 104. A plurality of application screens may be displayed simultaneously, or a plurality of application screens may be switched to be displayed one by one. One of the application screens that is in a state of being capable of accepting a user operation is described as being active. Typically, the active application screen has a highlighted frame and an input cursor is displayed to wait for input. The first display unit 104 may not include a touch sensor and may include a liquid crystal display only.

Figure 12:
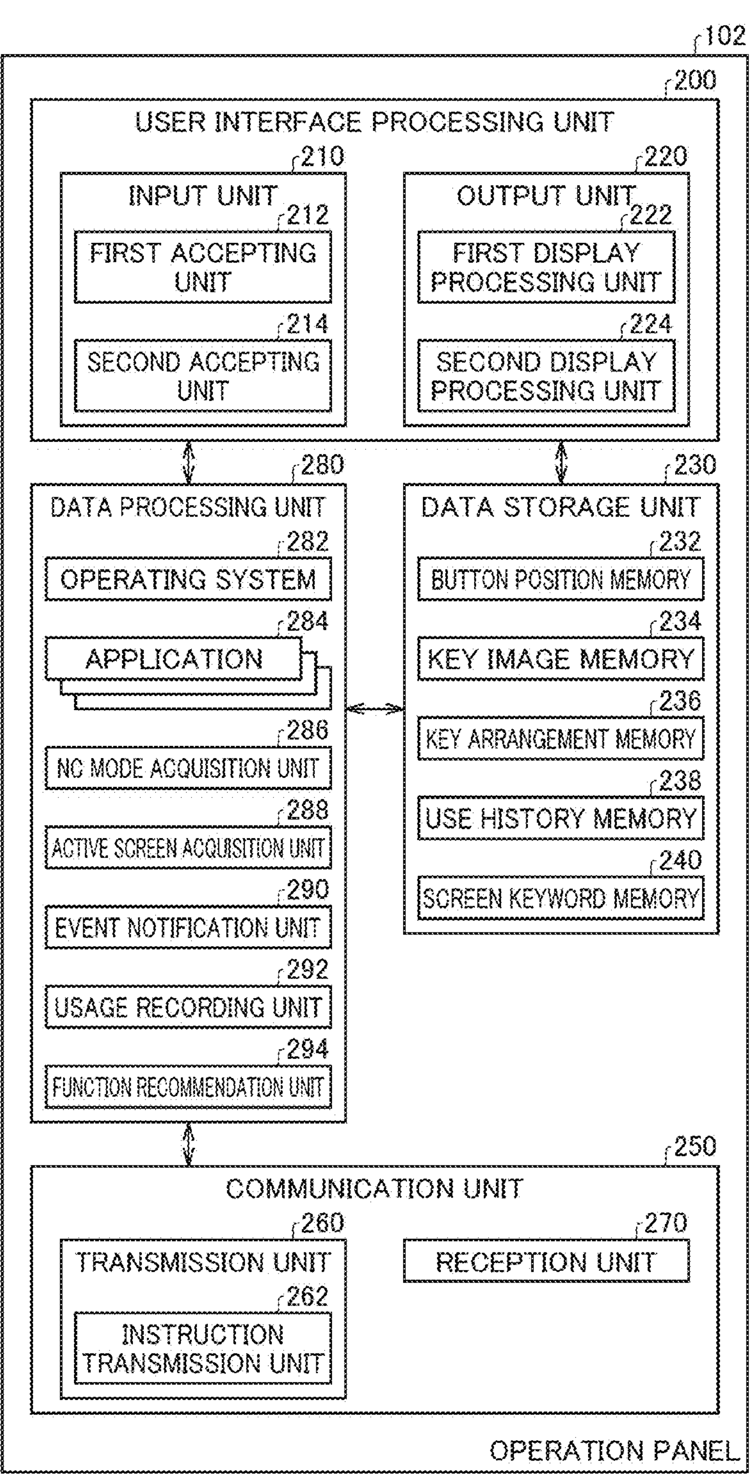
FIG. 12 is a functional block diagram of the operation panel.

For example, a plurality of application screens are displayed on the first display unit 104. In FIG. 2, a program running screen is displayed on the left side, a program editing screen is displayed on the upper right side, and a tool information screen is displayed on the lower right side. In this example, the program running screen is selected. When the program running screen is selected, a plurality of key images (SGL BLOCK, OPT STOP, etc.) corresponding to the program running screen are displayed on each button. In the program running screen that is active, a frame is highlighted by a thick line. The application screen means a screen displayed on the first display unit 104 by an application 284 (FIG. 12).

Figure 3:
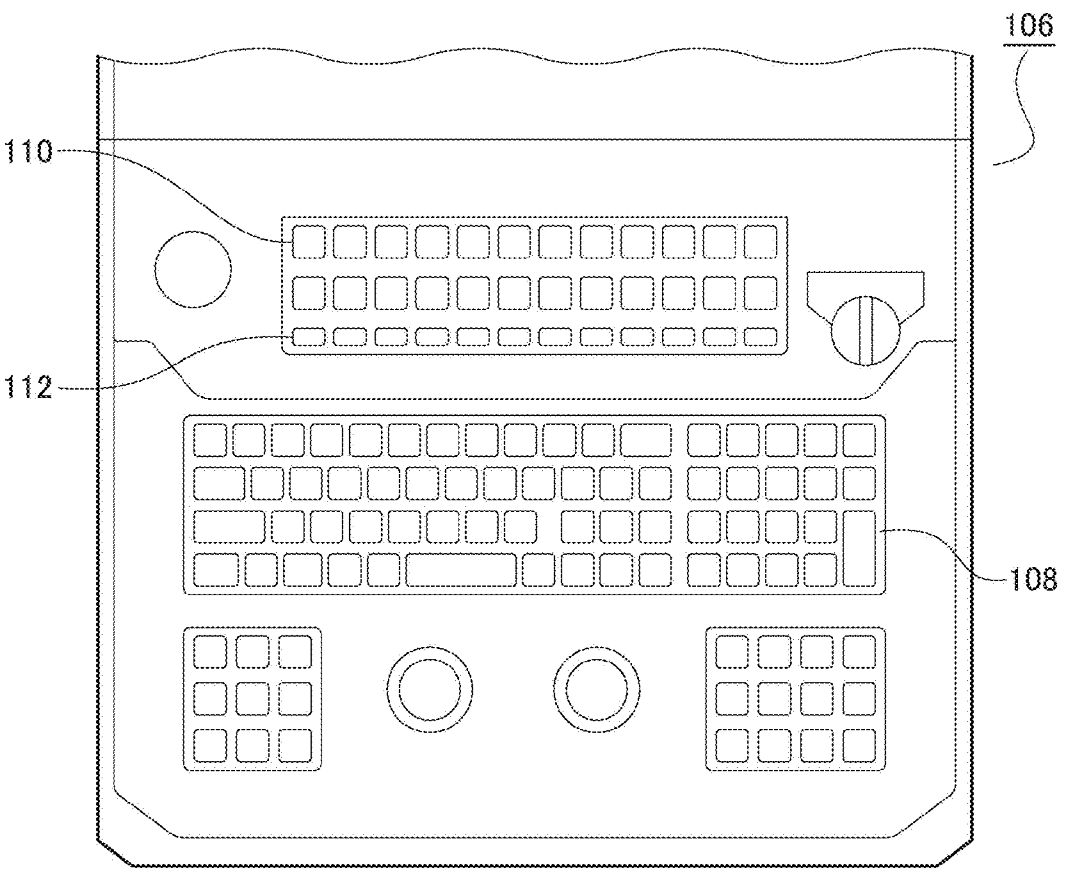
FIG. 3 is a plan view of an operation panel.

FIG. 3 is a plan view of the operation panel 106.

The operation panel 106 includes a normal keyboard 108 and the like and also includes function buttons 110 and tab buttons 112. At least one of a character, a number, a symbol, and a figure is displayed on the surface of each key on the keyboard 108. The function button 110 is a button allowing change of function assignment in accordance with the situation. A key image (at least one of a character, a number, a symbol, and a figure) indicating a currently assigned function is displayed on the function button 110. In this example, a total of 24 function buttons 110 of 2 rows×12 columns are provided. A plurality of key arrangements are set each of which includes these 24 keys as one set. That is, the function assigned to each function button 110 is specified by the type of the key arrangement.

The tab button 112 is a button for instructing change of the type of the key arrangement. In principle, the tab button 112 corresponds to the type of the key arrangement. Further, the operation panel 106 also includes a button and an adjusting knob that are related to a frequently used function and a safety-related function (for example, emergency stop).

In this example, the application screen can be operated by using the operation panel 106 and can also accept an operation by touching the touch panel. A basic operation can be performed only by the touch panel operation. In this sense, the role of the function button in the operation panel 106 can be said to be secondary. Structures of the function buttons 110 and the tab buttons 112 are described below.

Figure 4:
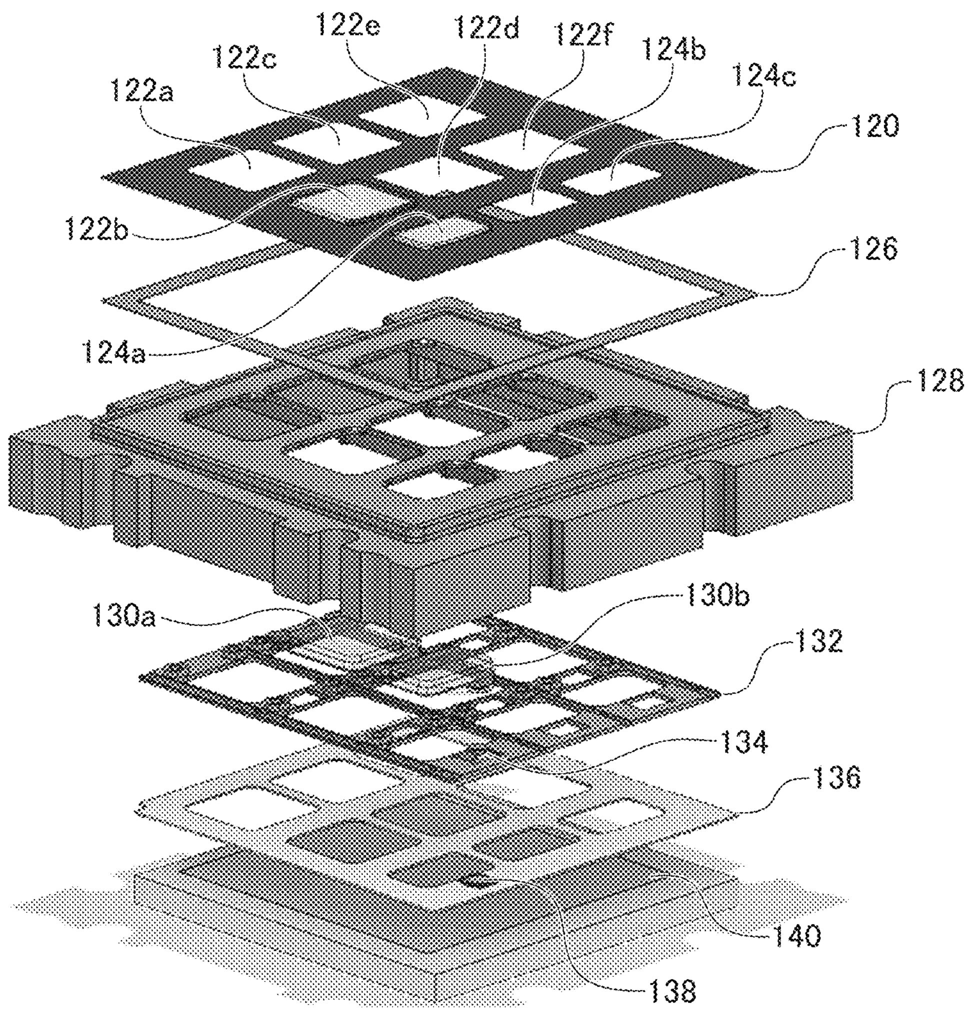
FIG. 4 is an assembly diagram of function buttons and tab buttons.

FIG. 4 is an assembly diagram of the function buttons 110 and the tab buttons 112.

A cover 120, a frame 126, a body 128, transparent covers **130*a* and 130*b*, an upper support portion 132, a lower support portion 136, and a second display unit 140** are stacked in this order. Although only nine buttons are illustrated here, the other buttons also have identical structures.

Figure 5:
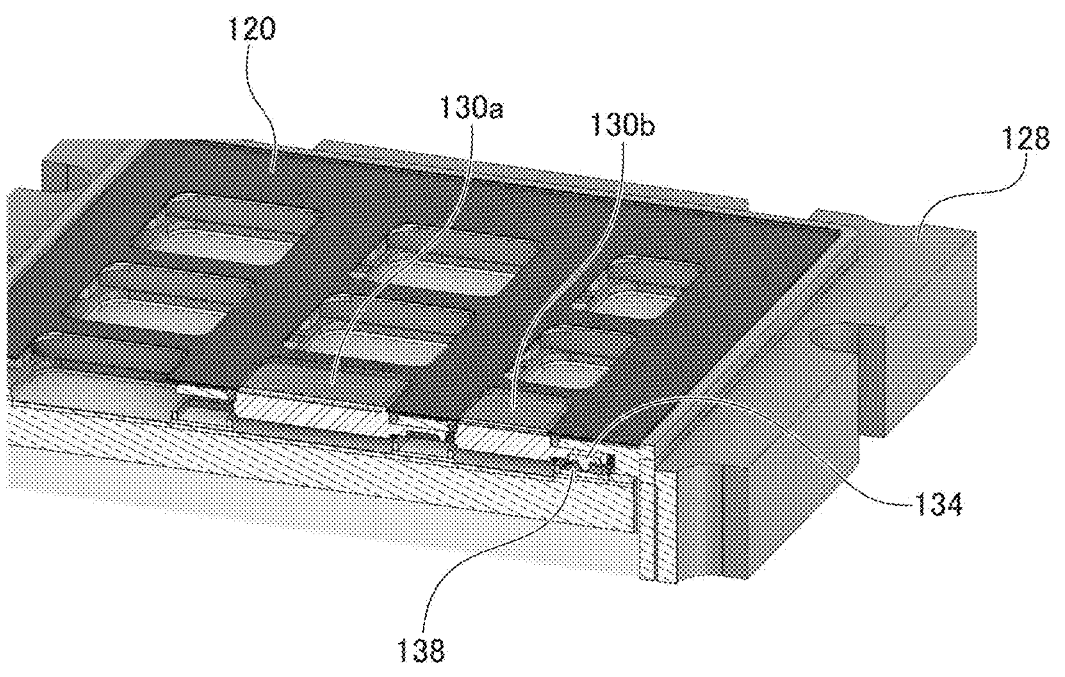
FIG. 5 is a perspective cross-sectional view of the function buttons and the tab buttons.

FIG. 5 is a perspective cross-sectional view of the function buttons 110 and the tab buttons 112.

FIG. 5 illustrates a state in which the cover 120, the frame 126, the body 128, the transparent covers **130*a* and 130*b*, the upper support portion 132, the lower support portion 136, and the second display unit 140** are stacked in this order as described above.

Buttonholes **122*a* to 122*f* corresponding to function buttons 110*a* to 110*f* (see FIG. 6, for example) are formed in the cover 120. Also, buttonholes 124*a* to 124*c* corresponding to tab buttons 112*a* to 112*c* (see FIG. 6**, for example) are also formed.

Similarly, buttonholes corresponding to the function buttons **110*a* to 110*f* and the tab buttons 112*a* to 112*c* are also formed in the body 128**.

Each of the transparent covers 130 of the function buttons 110 is set in such a manner that its surface is exposed through the corresponding buttonhole. Similarly, each of the transparent covers of the tab buttons 112 is set in such a manner that its surface is exposed through the corresponding buttonhole. FIG. 4 illustrates that the function button **110*b* can be seen through the transparent cover 130*a*. The function button 110*b* and the transparent cover 130*a* correspond to each other. The same is true of the other function buttons 110. Similarly, FIG. 4 illustrates that the tab button 112*a* can be seen through the transparent cover 130*b*. The tab button 112*a* and the transparent cover 130*b* correspond to each other. The same is true of the other tab buttons 112. One second display unit 140 shows function buttons (110*a* to 110*f*) and tab buttons (112*a* to 112*c***).

Each transparent cover **130*b* is supported by the upper support portion 132 via an elastic body. The elastic body is not illustrated. When pressed down by a finger, the transparent cover 130*b* is depressed and presses down a movable contact 134 provided on the upper support portion 132. While FIG. 5 illustrates an example of the transparent cover 130*b* of a tab button 112, the same description is applied to the transparent covers 130*a* of the function buttons 110**.

A fixed contact 138 is provided on the lower support portion 136 located in a layer below the upper support portion 132 and is energized by coming into contact with the pressed movable contact 134, thereby causing generation of a signal indicating that the button is pressed. This structure of the button is identical to that of a tactile switch. When the finger is away from the transparent cover **130*a* or 130*b*, the transparent cover 130*a* or 130*b* returns to the original position by a repulsive force of the elastic body, and the signal is no longer output. Since the tactile switch has a feeling of button depression, it is easy to recognize the timing of pressing the button by the sense of a finger. For example, in a case where a user wants to cause the machine tool 100 to perform a certain function in accordance with the situation of machining while looking at inside of the machine tool 100, the user presses the function button 110 without looking at the function button 110**. Even in this case, the user can perform an operation of waiting with his/her finger placed on the tactile switch and pressing the tactile switch at a proper timing. In a case of attempting to perform the same operation with a touch panel, it is difficult to hold and maintain the finger above a desired function icon without touching the touch panel. If the user operates the touch panel without looking at the touch panel, the user may touch a location outside the desired function icon. On the other hand, such a failure can be prevented by using a mechanical detection switch such as a tactile switch. Further, since the tactile switch has a push-in feeling, the user can easily grasp the timing of function activation.

Also in the upper support portion 132 and the lower support portion 136, buttonholes corresponding to the function buttons 110*a* to 110*f* and the tab buttons 112*a* to 112*c* are formed. In the second display unit 140 in the lowermost layer, a key image (at least one of a character, a number, a symbol, and a figure) is displayed in a region corresponding to each buttonhole. Therefore, the key image on the second display unit 140 can be seen from above through each transparent cover 130*a* or 130*b* and each buttonhole. The key image indicating a function assigned to each of the function buttons 100*a* to 110*f* can be seen in a vertical direction of the second display unit 140. Similarly, the key image indicating a function assigned to each of the tab buttons 112*a* to 112*c* can be seen in a vertical direction of the second display unit 140. The second display unit 140 is, for example, a liquid crystal display. In FIG. 4, when the liquid crystal display of the second display unit 140 is viewed vertically from above, key images of nine buttons in total, which are six function buttons 110*a* to 110*f* and three tab buttons 112*a* to 112*c* are displayed on the liquid crystal display. In the present embodiment, nine transparent covers 130*a* and 130*b* are independently separate from each other, and are arranged vertically above the liquid crystal display in a vertical direction of the second display unit. Note that the transparent covers 130*a* of the six function buttons 110*a* to 110*f* may alternatively be integrated and formed as a single sheet of cover.

When the function button 110 is pressed, the function assigned to the function button 110 is performed. For example, when a function button for an automatic mode is pressed, an NC mode of the machine tool 100 is switched to an automatic mode. When a function button for a manual mode is pressed, the NC mode of the machine tool 100 is switched to a manual mode. Further, when the tab button 112 is pressed, the key arrangement of the function buttons 110 is switched. Switching of key arrangement will be described in connection with FIGS. 6 to 11.

Figure 6:
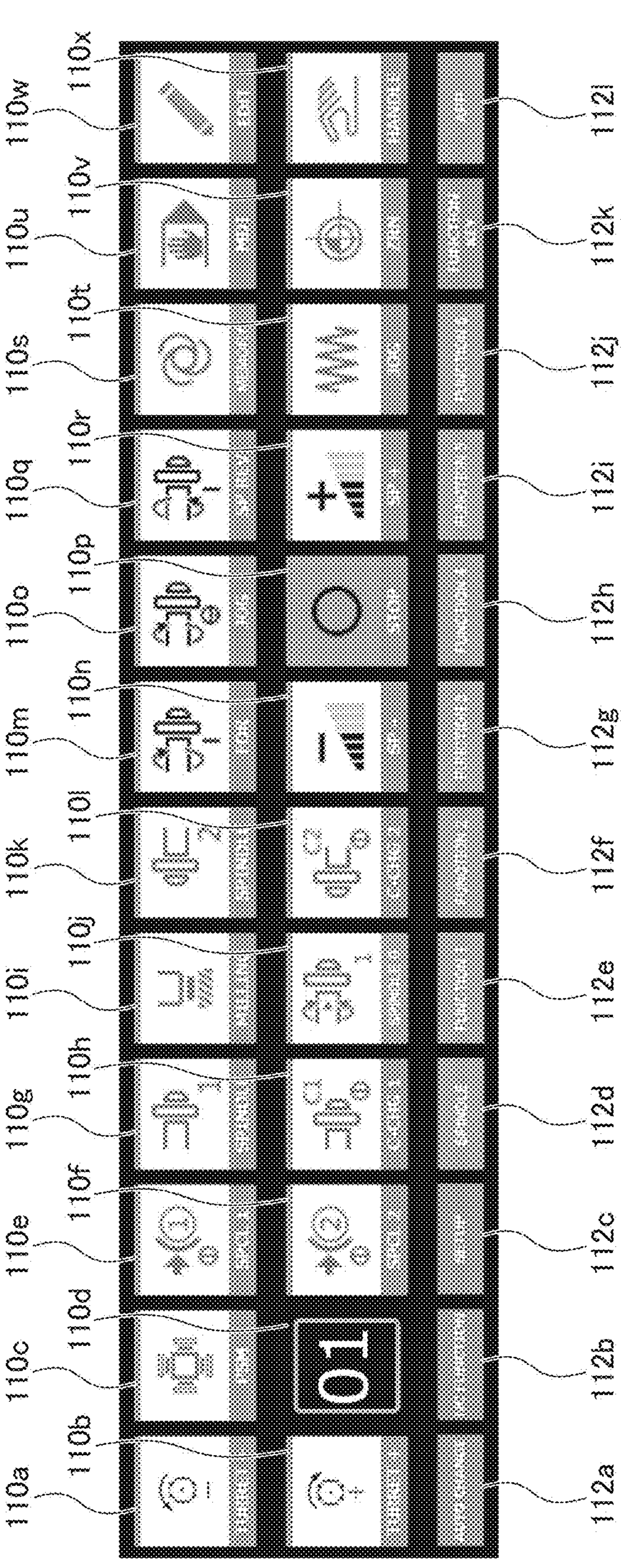
FIG. 6 is a diagram illustrating a display example of a key arrangement for NC FUNCTION.

FIG. 6 is a diagram illustrating a display example of a key arrangement for NC FUNCTION.

FIG. 6 illustrates the key arrangement for NC FUNCTION displayed when the tab button 112*b* for "NC FUNCTION" is pressed. In the key arrangement for NC FUNCTION (spindle/turret page), functions of operating a turret, operating a spindle, and the like are assigned to the function button 110*a* to a function button 110*r*.

Function buttons 110*s* to 110*x* are buttons for switching the NC mode. "MEMORY" (memory mode) assigned to the function button 110*s*, "JOG" (jog mode) assigned to the function button 110*t*, "MDI" (manual data input mode) assigned to the function button 110*u*, "ZRN" (zero return mode) assigned to the function button 110*v*, "EDIT" (edit mode) assigned to the function button 110*w*, and "HANDLE" (handle mode) assigned to the function button 110*x* are examples of functions for switching the NC mode. That is, when one of the function buttons 110*s* to 110*x* is pressed, the mode shifts to the NC mode of the type corresponding to the function button 110. The "memory mode" is an automatic operation mode in which a machining unit is caused to work in accordance with a control program prepared in advance. The "jog mode" is a manual operation mode in which spindle movement is performed mainly by operating a jog button. The "manual data input mode" is a mode in which a simple program command is manually input to cause the machining unit to work. The "zero return mode" is a mode of returning a control target such as a tool spindle to the machine origin. The "edit mode" is a mode for creating and editing a control program. The "handle mode" is a manual operation mode in which spindle movement is performed mainly by operating a handle.

Among these modes, the memory mode, the manual data input mode, and the edit mode belong to an automatic mode. On the other hand, the jog mode, the zero return mode, and the handle mode belong to a manual mode. Therefore, in determination of an operation scene of the machine tool described in the present embodiment (for example, S26 in FIGS. 15 and S76 in FIG. 17 described later), the memory mode, the manual data input mode, or the edit mode is determined as the automatic mode. Also, the jog mode, the zero return mode, or the handle mode is determined as the manual mode. The functions assigned to the function buttons 110*s* to 110*x* are common to the key arrangements.

When the tab button 112*c* for "SET UP" is pressed, the key arrangement is switched to a key arrangement for SET UP. In the key arrangement for SET UP (setup page), a tool setter function, a workpiece setter function, and the like are assigned to the function buttons 110*a* to 110*r*. When the tab button 112*d* for "SPINDLE" is pressed, the key arrangement is switched to a key arrangement for SPINDLE.

FIG. 23 is a diagram illustrating a display example of the key arrangement for SPINDLE.

The key arrangement for SPINDLE is the same as the key arrangement for NC FUNCTION illustrated in FIG. 6 except that no function is assigned to each of the function buttons 110*a*, 110*b*, and 110*c*. "TURRET −" (turret turning (−)), "TURRET+" (turret turning (+)), and "PSM" (presetter mode (ON/OFF)) are omitted because they are not used in "SPINDLE".

When the tab button 112*e* for "FUNCTION 1" is pressed, the key arrangement is switched to a key arrangement for FUNCTION 1. When the tab button 112*f* for "FUNCTION 2" is pressed, the key arrangement is switched to a key arrangement for FUNCTION 2. When the tab button 112*g* for "FUNCTION 3" is pressed, the key arrangement is switched to a key arrangement for FUNCTION 3. When the tab button 112*h* for "FUNCTION 4" is pressed, the key arrangement is switched to a key arrangement for FUNCTION 4. When the tab button 112*i* for "FUNCTION 5" is pressed, the key arrangement is switched to a key arrangement for FUNCTION 5. When the tab button 112*j* for "FUNCTION 6" is pressed, the key arrangement is switched to a key arrangement for FUNCTION 6. When the tab button 112*k* for "FUNCTION KEY" is pressed, the key arrangement is switched to the key arrangement for FUNCTION KEY.

Figure 7:
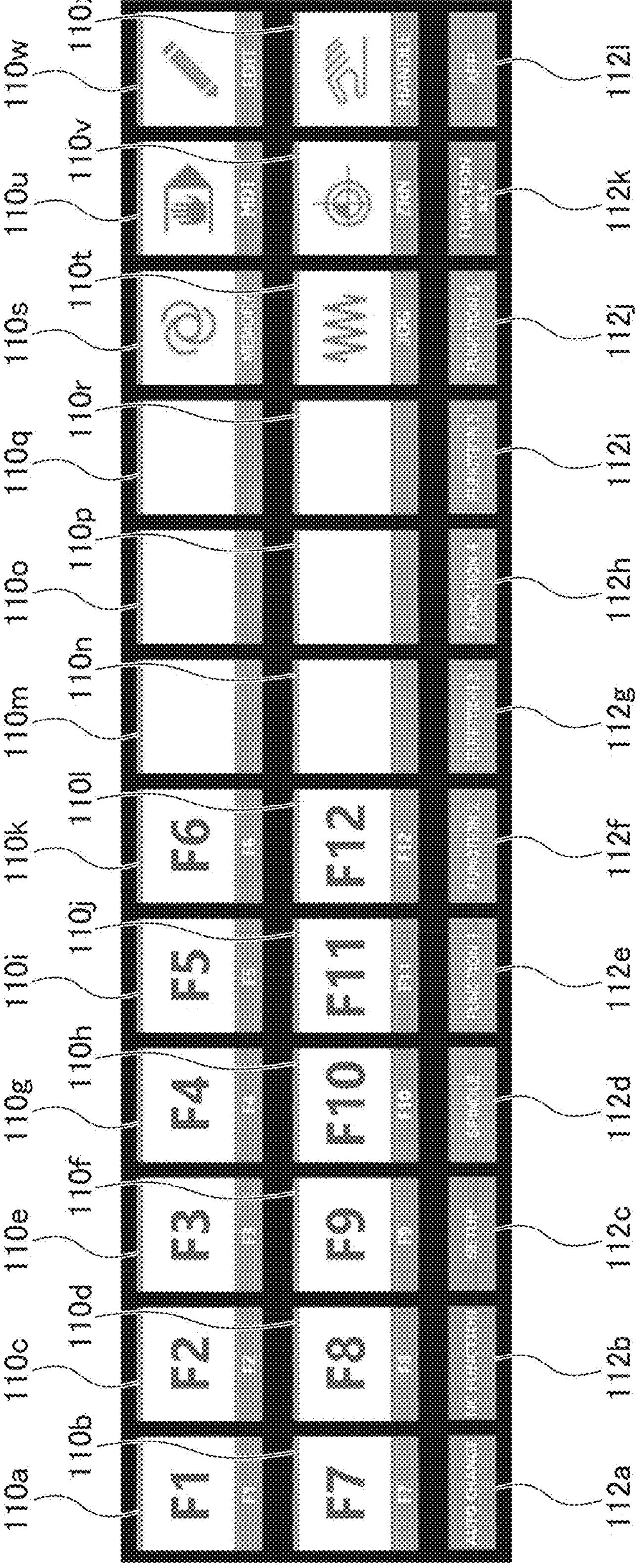
FIG. 7 is a diagram illustrating a display example of a key arrangement for FUNCTION KEY.

FIG. 7 is a diagram illustrating a display example of the key arrangement for FUNCTION KEY.

The function buttons 110*a* to 110*l* can be used in a manner identical to function keys "F1" to "F12" on a normal PC keyboard. For example, the function buttons 110*a* to 110*l* can be used also when CAM (Computer Aided Manufacturing) software is used.

The aforementioned key arrangements when the tab buttons 112*b* to 112*k* are pressed are uniquely determined by the tab buttons 112*b* to 112*k*. For some key arrangements, function replacement may be automatically recommended. Similarly, the key arrangement may be able to be customized by a user. Function recommendation and key arrangement customization will be described in modifications.

Unlike the examples of the tab buttons 112*b* to 112*k*, a key arrangement when the tab button 112*a* for "AUTO CHANGE" is pressed is not uniquely determined. The key arrangement for "AUTO CHANGE" is determined by an NC mode in the machine tool 100, that is, an operation scene of the machine tool 100. If the NC mode is an automatic mode when the tab button 112*a* for "AUTO CHANGE" is pressed, the key arrangement is switched to a key arrangement for NC automatic mode. In the key arrangement for NC automatic mode, functions such as block deletion and dry run are assigned to the function buttons 110*a* to 110*l*. For example, when the machine tool 100 is in the NC automatic mode, the second display unit 140 displays a second key image indicating block deletion as a second function. On the other hand, when the NC mode is a manual mode when the tab button 112*a* is pressed, the key arrangement is switched to a key arrangement for NC manual mode. In the key arrangement for NC manual mode, functions such as turret turning and spindle forward rotation are assigned to the function buttons 110*a* to 110*l*. For example, when the machine tool 100 is in the NC manual mode, the second display unit 140 displays a third key image indicating turret turning as a third function.

Here, the relation between the tab button 112*a* for "AUTO CHANGE" and an application screen is described. An application screen displayed when the tab button 112*a* for "AUTO CHANGE" has been pressed is any of application screens. That is, a specific application screen is not always displayed when the tab button 112*a* for "AUTO CHANGE" is pressed. As illustrated in FIG. 2, the program running screen, the program editing screen, and the tool information screen may be displayed, or a plurality of application screens in another combination may be displayed. In a case where a plurality of application screens are displayed, which of the application screens is active is not limited either. In the example illustrated in FIG. 2, the program running screen may be active, the program editing screen may be active, or the tool information screen may be active. Further, only one application screen may be displayed. Also in a case where only one application screen is displayed, the type of the application screen may be any type. Only the program running screen may be displayed, only the program editing screen may be displayed, only the tool information screen may be displayed, or only another application screen may be displayed. Further, an application screen displayed on the first display unit 104 is not changed by pressing of the tab button 112*a* for "AUTO CHANGE". The application screen is not switched to another application screen to be displayed, or the active state is not changed between application screens. Furthermore, the key arrangement is not determined depending on the type of the displayed application screen or depending on the type of the active application screen. In addition, tab buttons are not determined depending on the type of the displayed application screen or depending on the type of the active application screen. That is, tab buttons are not automatically selected.

Further, when the NC mode is changed from the automatic mode to the manual mode in the key arrangement for NC automatic mode, the key arrangement is switched to the key arrangement for NC manual mode at this time. To the contrary, when the NC mode is changed from the manual mode to the automatic mode in the key arrangement for NC manual mode, the key arrangement is switched to the key arrangement for NC automatic mode at this time.

The key arrangement when the tab button 112*l* for "APP" has been pressed is also not determined uniquely. The key arrangement for "APP" is determined depending on the type of an application screen that is active on the operation panel 102 (hereinafter, referred to as an "active screen"). In a case where only one type of application screen is displayed, the displayed application screen is active. That is, the key arrangement displayed on the second display unit 140 is determined depending on the type of the one application screen that is displayed. Examples of these key arrangements are described below. When the tab button 112 other than the tab button 112*l* for "APP" has been pressed, the key arrangement is not switched depending on the type of the application screen.

Figure 8:
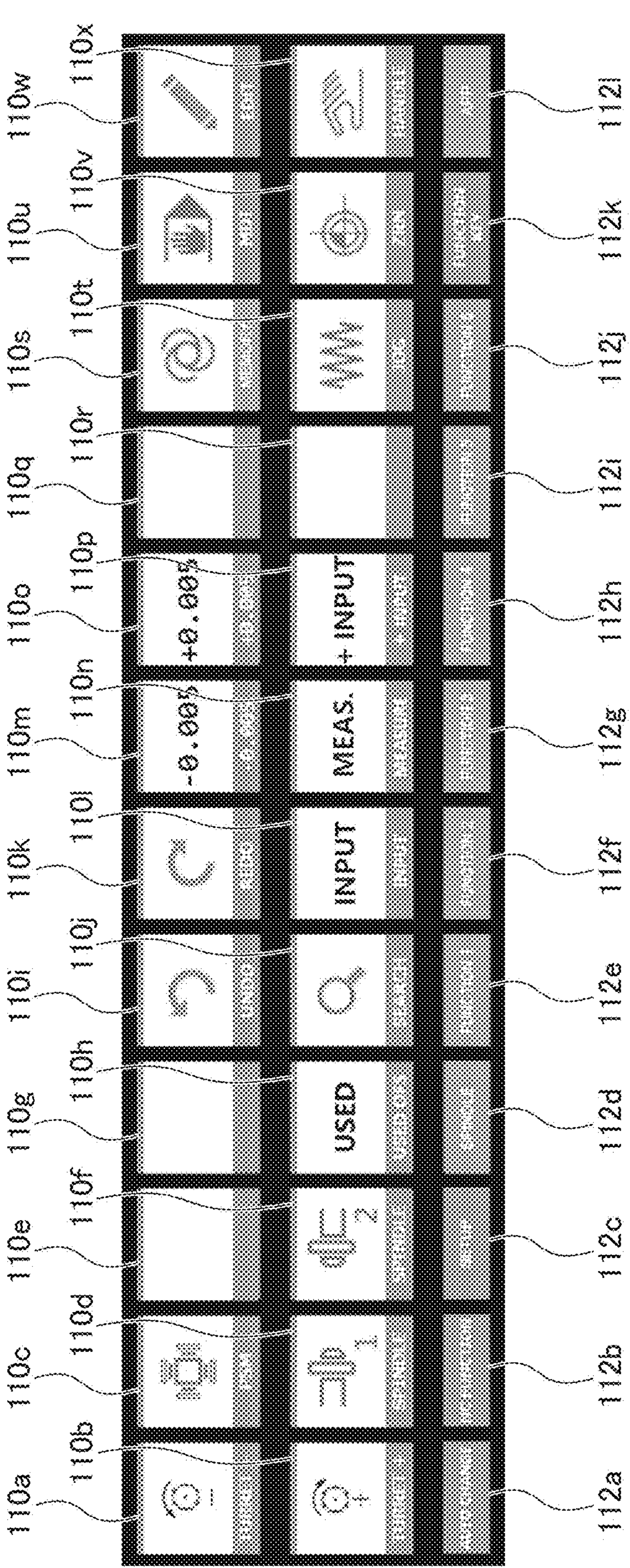
FIG. 8 is a diagram illustrating a display example of a key arrangement for tool offset screen.

FIG. 8 is a diagram illustrating a display example of a key arrangement for tool offset screen.

If the machine tool 100 is a turning center and a tool offset screen is active when the tab button 112*l* for "APP" has been pressed, the key arrangement is switched to the illustrated key arrangement for tool offset screen. Functions assigned to the function buttons 110*a* to 110*r* in the key arrangement for tool offset screen are roughly divided into functions related to operations of the machine tool 100 and functions related to operations of an application. The functions are roughly divided in the same manner in FIGS. 9 to 11 that will be described later.

"TURRET−" (turret turning (−)) assigned to the function button 110*a*, "TURRET+" (turret turning (+)) assigned to the function button 110*b*, "PSM" (presetter mode (ON/OFF)) assigned to the function button 110*c*, "SPINDLE" (spindle selection (main)) assigned to the function button 110*d*, and "SPINDLE" (spindle selection (sub)) assigned to the function button 110*f* are examples of the functions related to operations of the machine tool 100. A key image indicating "TURRET−" (turret turning (−)) assigned to the function button 110*a* is an example of a first key image displayed on a first button corresponding to an application screen, and a key image indicating "TURRET+" (turret turning (+)) assigned to the function button 110*b* is an example of a second key image displayed on a second button corresponding to the application screen.

Meanwhile, "USED OFS" (display a used tool offset) assigned to the function button 110*h*, "UNDO" (undo) assigned to the function button 110*i*, "SEARCH" (correction number search) assigned to the function button 110*j*, "REDO" (redo) assigned to the function button 110*k*, "INPUT" (direct input) assigned to the function button 110*l*, "−0.005" (fixed amount input (−0.005)) assigned to the function button 110*m*, "MEAS." (measurement) assigned to the function button 110*n*, "+0.005" (fixed amount input (+0.005)) assigned to the function button 110*o*, and "+INPUT" (+input) assigned to the function button 110*p* are examples of the functions related to operations of a tool offset application.

A use case of the tool offset screen is described. For example, when inputting a tool offset value, a user uses the function button 110*n* for "MEAS." (measurement) and the function button 110*l* for "INPUT" (direct input). When the user corrects the tool offset value or adjusts a wear offset, the user uses the function button 110*p* for "+INPUT" (+input), the function button 110*m* for "−0.005" (fixed amount input (−0.005)), and the function button 110*o* for "+0.005" (fixed amount input (+0.005)). When indexing a tool for which the tool offset value is to be measured, the user uses the function button 110*a* for "TURRET −" (turret turning (−)) and the function button 110*b* for "TURRET+" (turret turning (+)). When setting whether the tool for which measurement is to be performed is used for a main spindle or a sub spindle, the user uses the function button 110*d* for "SPINDLE" (spindle selection (main)) and the function button 110*f* for "SPINDLE" (spindle selection (sub)). When checking a tool offset used in an NC program, the user uses the function button 110*h* for "USED OFS" (display a used tool offset).

Figure 9:
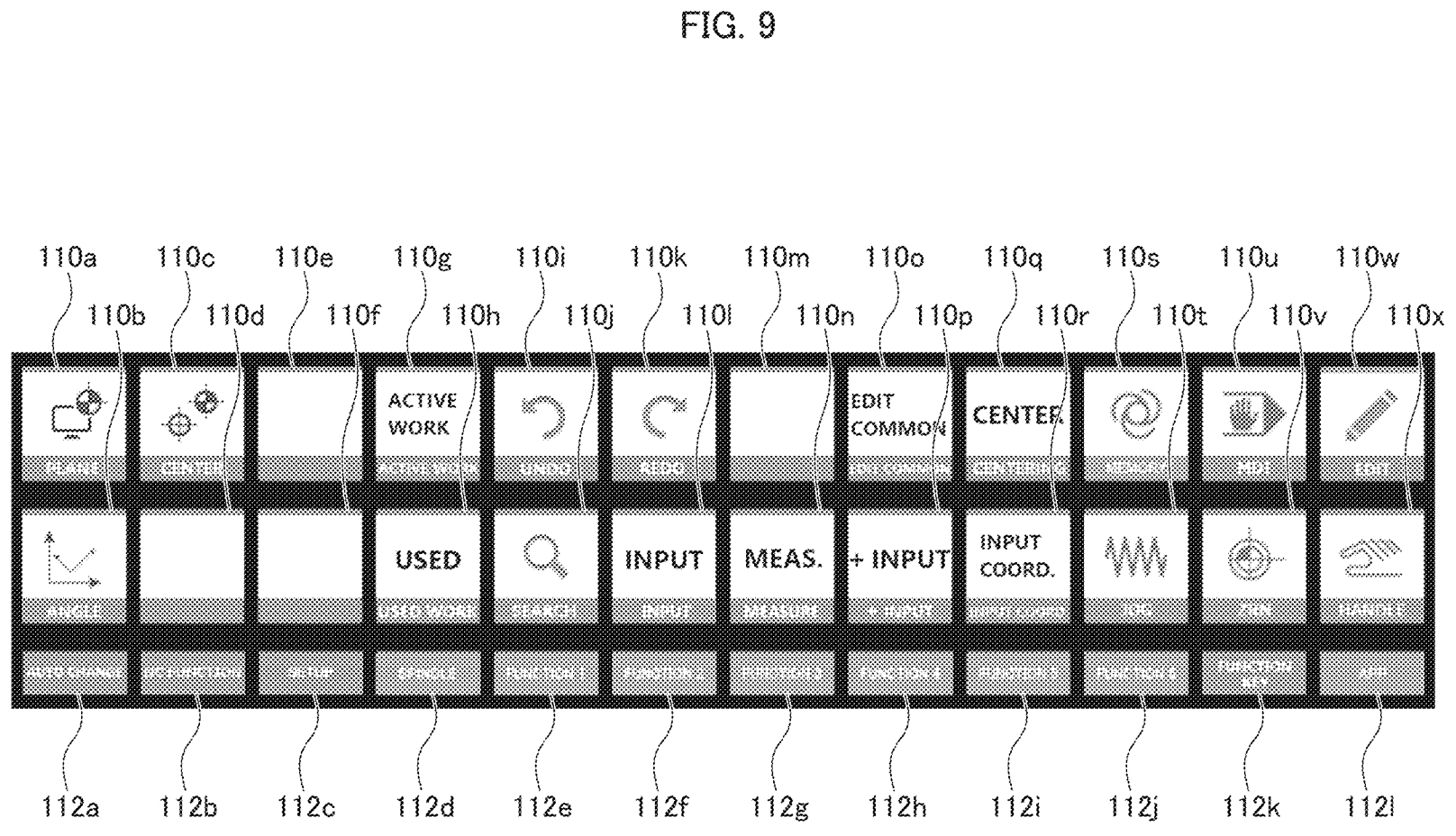

FIG. 9 is a diagram illustrating a display example of a key arrangement for workpiece offset screen.

If the machine tool 100 is a machining center and a workpiece offset screen is active when the tab button 112*l* for "APP" is pressed, the key arrangement is switched to the illustrated key arrangement for workpiece offset screen.

"PLANE" (workpiece setter (reference plane measurement)) assigned to the function button 110*a*, "ANGLE" (workpiece setter (coordinate correction)) assigned to the function button 110*b*, and "CENTER" (workpiece setter (center point measurement)) assigned to the function button 110*c* are examples of functions related to operations of the machine tool 100.

"ACTIVE WORK" (display an active workpiece) assigned to the function button 110*g*, "USED WORK" (display a used workpiece offset) assigned to the function button 110*h*, "UNDO" (undo) assigned to the function button 110*i*, "SEARCH" (search) assigned to the function button 110*j*, "REDO" (redo) assigned to the function button 110*k*, "INPUT" (direct input) assigned to the function button 110*l*, "MEAS." (measurement) assigned to the function button 110*n*, "EDIT COMMON" (input a common workpiece coordinate system) assigned to the function button 110*o*, "+INPUT" (+input) assigned to the function button 110*p*, "CENTERING" (centering) assigned to the function button 110*q*, and "INPUT COORD" (coordinate input) assigned to the function button 110*r* are examples of functions related to operations of a workpiece offset application.

A use case of the workpiece offset screen is described. For example, when inputting a workpiece offset value, a user uses the function button 110*n* for "MEAS." (measurement) and the function button 110*l* for "INPUT" (direct input). When shifting a coordinate system, the user uses the function button 110*p* for "+INPUT" (+input). When performing measurement for an attached workpiece (workpiece setter), the user uses the function button 110*a* for "PLANE" (workpiece setter (reference plane measurement)), the function button 110*b* for "ANGLE" (workpiece setter (coordinate correction)), and the function button 110*c* for "CENTER" (workpiece setter (center point measurement)). When setting the origin of machining, the user uses the function button 110*q* for "CENTERING" (centering). When checking a workpiece correction value being used, the user uses the function button 110*g* for "ACTIVE WORK" (display an active workpiece). When checking a workpiece offset used in an NC program, the user uses the function button 110*h* for "USED WORK" (display a used workpiece offset).

Figure 10:
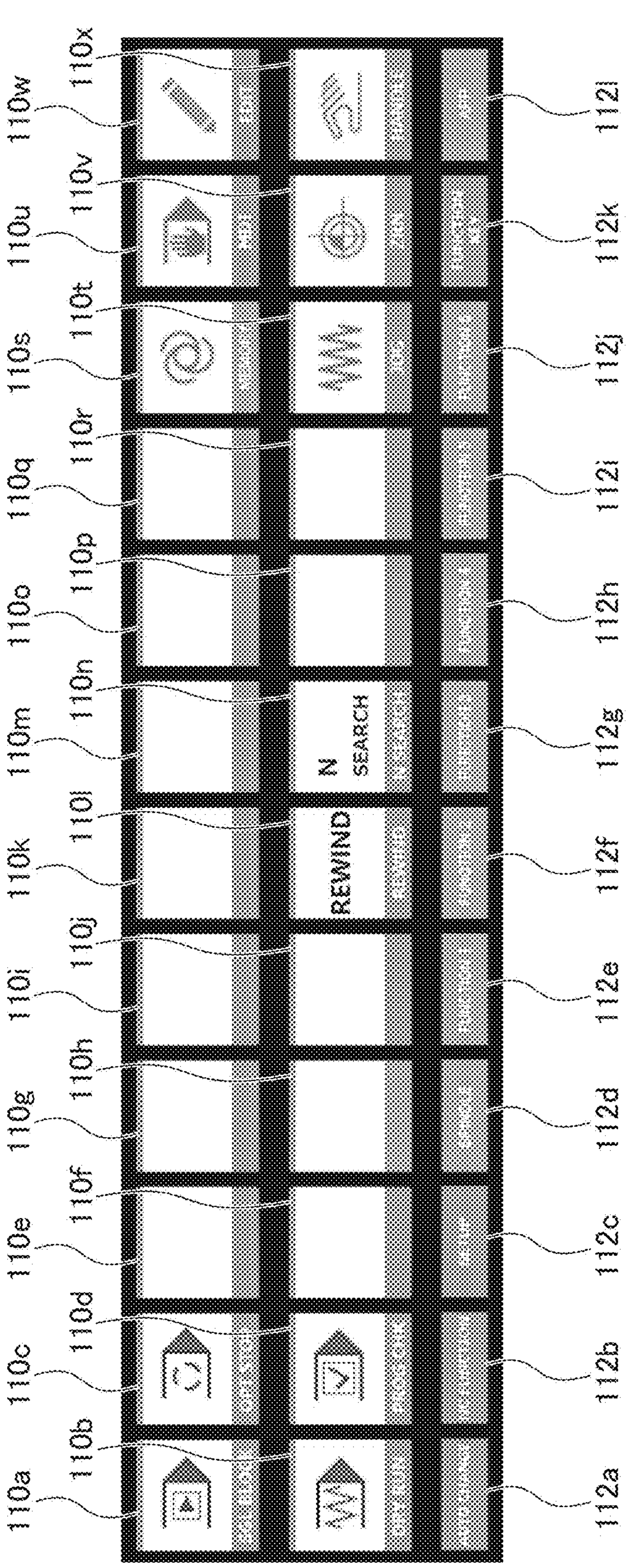
FIG. 10 is a diagram illustrating a display example of a key arrangement for program running screen.

FIG. 10 is a diagram illustrating a display example of a key arrangement for program running screen.

If a program running screen is active when the tab button 112*l* for "APP" is pressed, the key arrangement is switched to the illustrated key arrangement for program running screen. In the example of FIG. 2, since the program running screen is active, the key arrangement for program running screen is displayed.

"SGL BLOCK" (single block) assigned to the function button 110*a*, "DRY RUN" (dry run) assigned to the function button 110*b*, "OPT STOP" (optional stop) assigned to the function button 110*c*, and "PROG CHK" (program check) assigned to the function button 110*d* are examples of functions related to operations of the machine tool 100.

"REWIND" (cue) assigned to the function button 110*l* and "N SEARCH" (N search) assigned to the function button 110*n* are examples of functions related to operations of a program running application.

A use case of the program running screen is described. For example, when checking an operation of an NC program, a user uses the function button 110*a* for "SGL BLOCK" (single block), the function button 110*b* for "DRY RUN" (dry run), and the function button 110*d* for "PROG CHK" (program check). In order to stop the NC program temporarily and safely, the user uses the function button 110*a* for "SGL BLOCK" (single block) and the function button 110*c* for "OPT STOP" (optional stop). When running the NC program from the beginning thereof, the user uses the function button 110*l* for "REWIND" (cue). When running a specific process of the NC program, the user uses the function button 110*n* for "N SEARCH" (N search).

Figure 11:
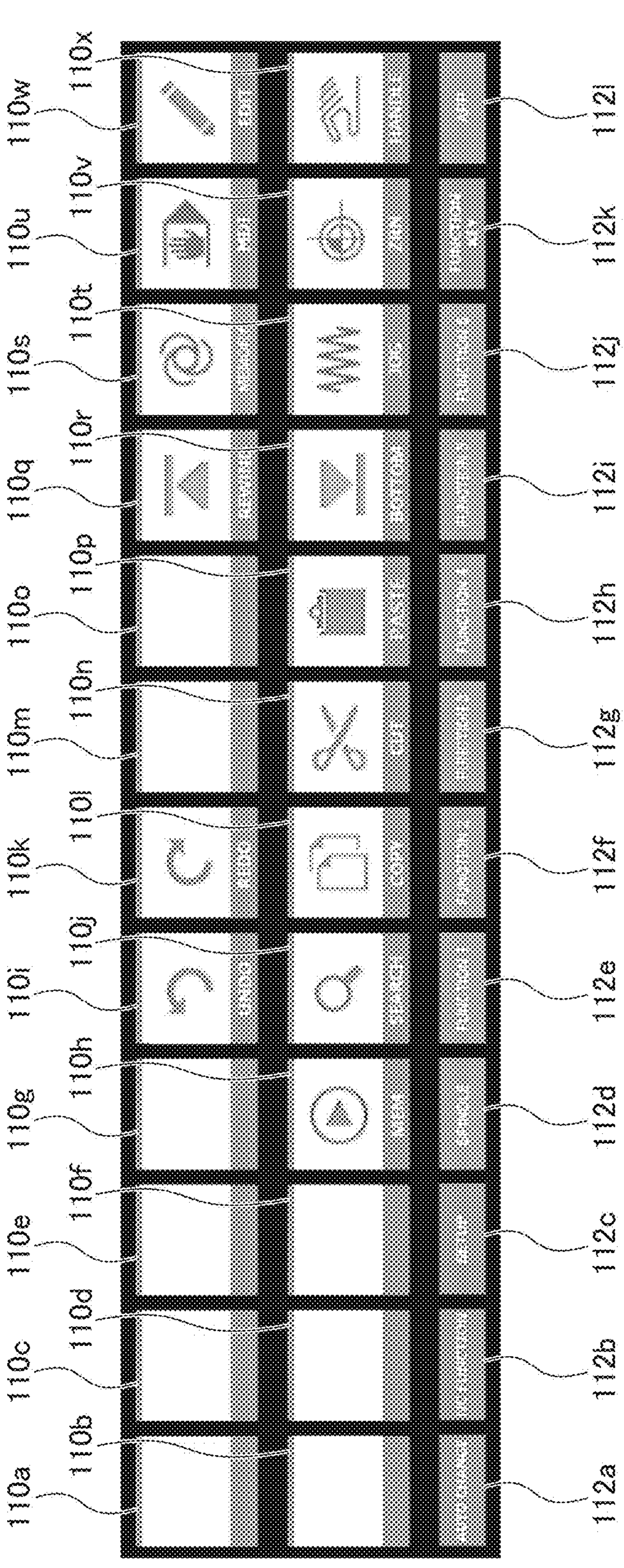
FIG. 11 is a diagram illustrating a display example of a key arrangement for program editing screen.

FIG. 11 is a diagram illustrating a display example of a key arrangement for program editing screen.

If a program editing screen is active when the tab button 112*l* for "APP" is pressed, the key arrangement is switched to the illustrated key arrangement for program editing screen.

In this key arrangement example, functions related to operations of the machine tool 100 are not assigned. "MEM" (running mode) assigned to the function button 110*h*, "UNDO" (undo) assigned to the function button 110*i*, "SEARCH" (search) assigned to the function button 110*j*, "REDO" (redo) assigned to the function button 110*k*, "COPY" (copy) assigned to the function button 110*l*, "CUT" (cut) assigned to the function button 110*n*, "PASTE" (paste) assigned to the function button 110*p*, "REWIND" (to top) assigned to the function button 110*q*, and "BOTTOM" (to end) assigned to the function button 110*r* are examples of functions related to operations of a program editing application.

A use case of the program editing screen is described. For example, when editing an NC program, a user uses the function button 110*l* for "COPY" (copy), the function button 110*n* for "CUT" (cut), and the function button 110*p* for "PASTE" (paste). When moving a portion to be edited in the NC program, the user uses the function button 110*j* for "SEARCH" (search), the function button 110*q* for "REWIND" (to top), and the function button 110*r* for "BOTTOM" (to end). When running the NC program, the user uses the function button 110*h* for "MEM" (running mode).

When the active screen is changed in a state where the tab button 112*l* for "APP" is selected as described above, the key arrangement is switched in accordance with an operation screen that becomes active. For example, when the program running screen becomes active as illustrated in FIG. 2 in a case of the key arrangement for program editing screen, the key arrangement is switched to the key arrangement for program running screen.

FIG. 12 is a functional block diagram of the operation panel 102.

The components of the operation panel 102 are implemented by hardware including computing units such as CPUs (Central Processing Unit) and various co-processors, storage devices such as memories and storages, and wired or wireless communication lines that connect these units and devices, and software that is stored in the storage devices and supplies processing instructions to the computing units. Computer programs may be constituted by device drivers, operating systems, various application programs on upper layers thereof, and a library that provides common functions to these programs. Blocks in the drawings do not refer to configurations in units of hardware but to blocks in units of functions.

The operation panel 102 includes a user interface processing unit 200, a data storage unit 230, a communication unit 250, and a data processing unit 280. The user interface processing unit 200 is engaged in user interface processing via a touch panel of the first display unit 104 and the operation panel 106. The data storage unit 230 stores various types of data therein. The data storage unit 230 is implemented by, for example, a RAM, a ROM, a flash memory, an SSD (Solid State Device), a hard disk, another storage device, or an appropriate combination thereof. The communication unit 250 is engaged in processing of communication with the machine tool 100. The data processing unit 280 carries out various types of processing on the basis of data obtained by the communication unit 250 and data stored in the data storage unit 230. The data processing unit 280 also functions as interfaces of the user interface processing unit 200, the data storage unit 230, and the communication unit 250.

The user interface processing unit 210 includes an input unit 210 that accepts operation input by a user and an output unit 220 that presents information to the user.

The input unit 210 includes a first accepting unit 212 and a second accepting unit 214. The first accepting unit 212 accepts a touch operation on the touch panel of the first display unit 104. The second accepting unit 214 accepts various operations on the operation panel. The output unit 220 includes a first display processing unit 222 and a second display processing unit 224. The first display processing unit 222 performs display processing in the first display unit 104. The second display processing unit 224 performs display processing in the second display unit 140.

The data storage unit 230 includes a button position memory 232, a key image memory 234, a key arrangement memory 236, a use history memory 238, and a screen keyword memory 240.

The button position memory 232 memorizes a position where a key image of the function button 110 is to be displayed. Details of the button position memory 232 will be described later in connection with FIG. 13. The key image memory 234 memorizes key image data for each function. The key arrangement memory 236 memorizes a key arrangement for each key arrangement type. The key arrangement is defined by a function corresponding to a function button ID. The use history memory 238 memorizes, with regard to each function, relevant keywords and the number of times of use for each user. Details of the use history memory 238 will be described in connection with FIG. 20. The screen keyword memory 240 memorizes a keyword relevant to an application screen. Details of the screen keyword memory 240 will be described in connection with FIG. 21.

The communication unit 250 includes a transmission unit 260 that transmits data to the machine tool 100 and a reception unit 270 that receives data from the machine tool 100. The transmission unit 260 includes an instruction transmission unit 262 that transmits a function instruction to the machine tool 100.

The data processing unit 280 includes an operating system 282, the application 284, an NC mode acquisition unit 286, an active screen acquisition unit 288, an event notification unit 290, a usage recording unit 292, and a function recommendation unit 294.

The operating system 282 may be an operating system for a general PC. In the present embodiment, it is assumed that the operating system 282 manages an active state of application screens. Examples of the application 284 include a tool offset application, a workpiece offset application, a program running application, and a program editing application.

The NC mode acquisition unit 286 inquires of the machine tool 100 to acquire a current NC mode in the machine tool 100. The active screen acquisition unit 288 inquires of the operating system 282 to acquire the type of a currently active application screen. Alternatively, the active screen acquisition unit 288 may acquire the type of the currently active application screen from the application 284. For example, the application 284 may notify the active screen acquisition unit 288 of the type of the active screen by using a shared memory area. The event notification unit 290 notifies the application 284 of a function event generated by pressing of the function button 110.

The usage recording unit 292 records the number of times of use of each function by a user in the use history memory 238. The function recommendation unit 294 recommends a function to be added to a key arrangement to the user.

FIG. 13 is a data structure diagram of the button position memory 232.

The button position memory 232 memorizes a reference position coordinate for each function button 110. The reference position coordinate indicates a predetermined point (for example, an upper left end) of a rectangle that is a key image display region in the second display unit 140. In this example, a function button ID "FB01" corresponds to the function button 110*a*, and (X1:Y1) indicates a predetermined point of a rectangle in which the key image of "TURRET −" illustrated in FIG. 6 is displayed. A function button ID "FB02" corresponds to the function button 110*b*, and (X1:Y2) indicates a predetermined point of a rectangle in which the key image of "TURRET+" illustrated in FIG. 6 is displayed.

Figure 14:
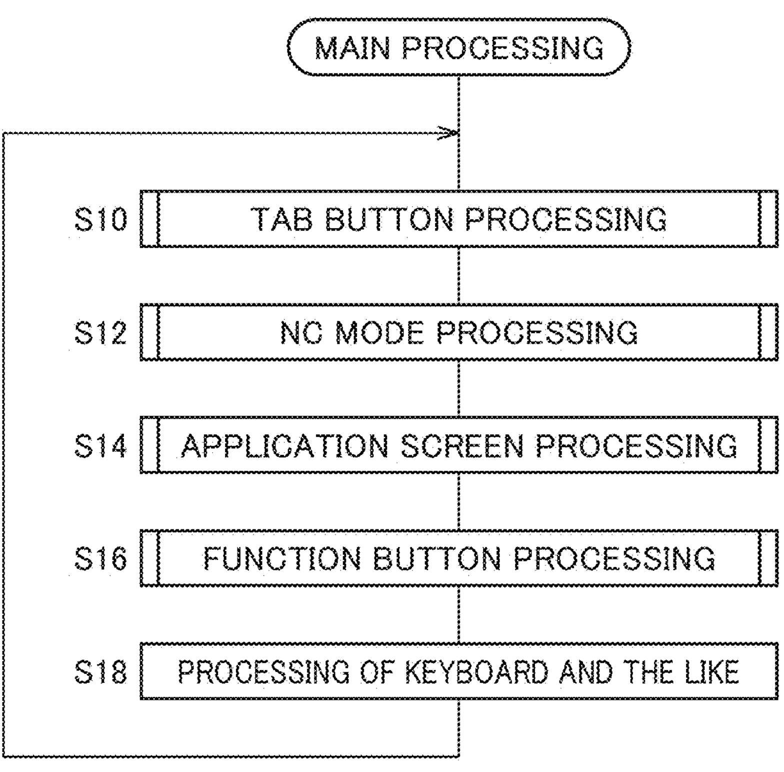
FIG. 14 is a flowchart illustrating a procedure of button control processing in the operation panel.

FIG. 14 is a flowchart illustrating a procedure of button control processing in the operation panel 102.

In tab button processing (S10), the operation panel 102 performs switching of a key arrangement when a tab button is pressed. The tab button processing (S10) will be described later in connection with FIGS. 15 and 16.

In NC mode processing (S12), the operation panel 102 performs switching of a key arrangement when an NC mode is changed. The NC mode processing (S12) will be described later in connection with FIG. 17.

In application screen processing (S14), the operation panel 102 performs switching of a key arrangement when an active screen is changed. The application screen processing (S14) will be described later in connection with FIG. 18.

In function button processing (S16), the operation panel 102 performs processing when the function button 110 is pressed. The function button processing (S16) will be described later in connection with FIG. 19.

In processing of keyboard and the like (S18), the operation panel 102 performs processing when the keyboard 108, an adjusting knob, or the like is operated as in a conventional technique. The operation panel 102 then returns to S10 and repeats the process.

Figure 15:
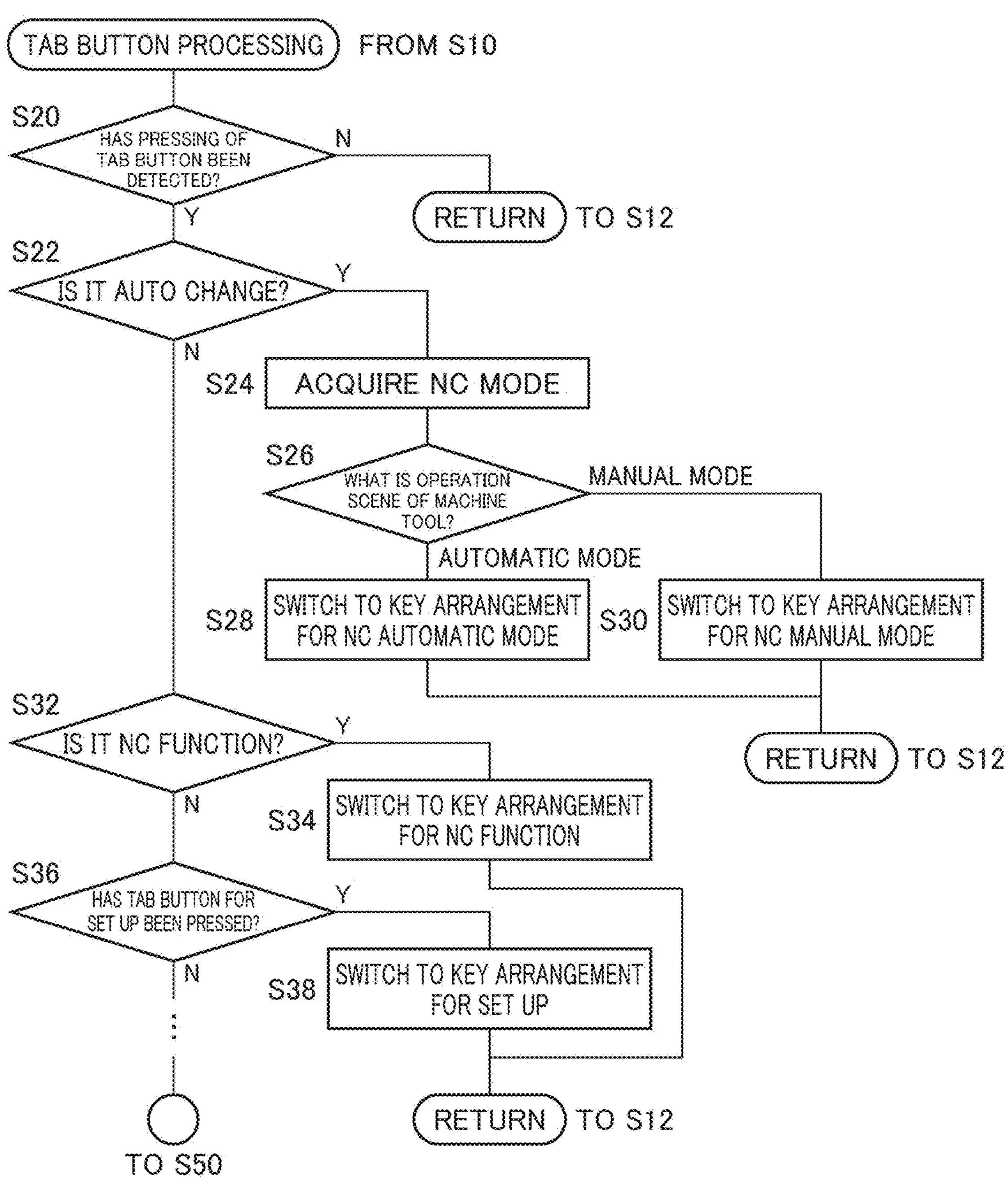
FIG. 15 is a flowchart illustrating a procedure of tab button processing.
Figure 16:
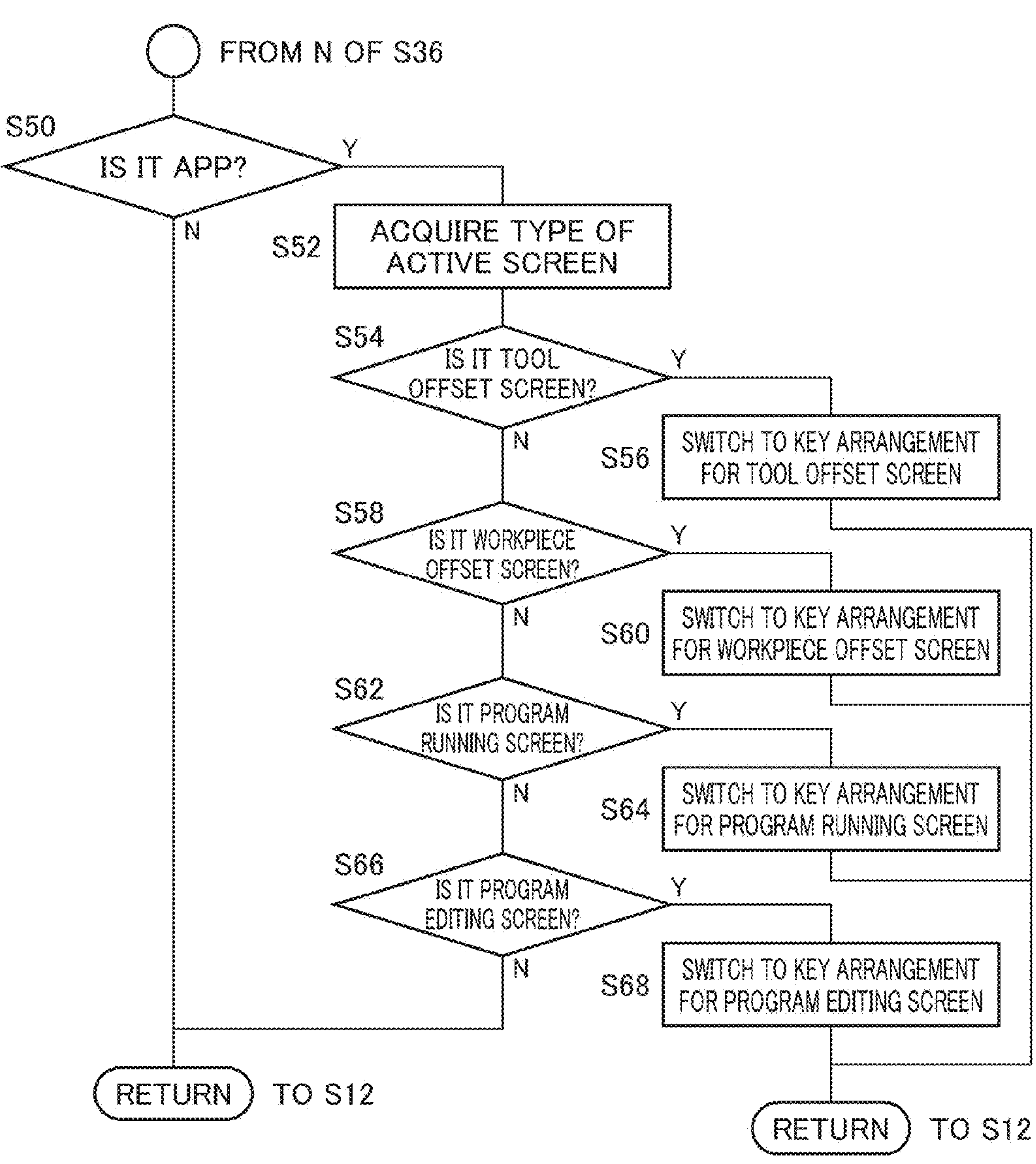
FIG. 16 is a flowchart of the procedure of tab button processing.

FIGS. 15 and 16 are flowcharts of the procedure of tab button processing.

When the second accepting unit 214 detects pressing of the tab button 112 (Y in S20), processing of S22 and thereafter is performed. When the second accepting unit 214 does not detect pressing of the tab button 112 (N in S20), the process returns to S12 in FIG. 14.

When the tab button 112*a* for "AUTO CHANGE" is pressed (Y in S22), the NC mode acquisition unit 286 acquires an NC mode from the machine tool 100 (S24). The second display processing unit 224 determines a key arrangement depending on the acquired NC mode, that is, an operation scene of the machine tool 100 (S26). In a case where the operation scene of the machine tool 100 is an automatic mode (a memory mode, a manual data input mode, or an edit mode), the second display processing unit 224 switches the key arrangement to the key arrangement for NC automatic mode (S28). Meanwhile, in a case where the operation scene of the machine tool 100 is a manual mode (a jog mode, a zero return mode, or a handle mode), the second display processing unit 224 switches the key arrangement to the key arrangement for NC manual mode (S30).

In switching of the key arrangement, the second display processing unit 224 refers to the key arrangement memory 236, specifies a function corresponding to each function button 110 in the key arrangement, and acquires key image data indicating the function from the key image memory 234. The second display processing unit 224 then refers to the button position memory 232 and displays a key image in accordance with a reference position coordinate of each function button 110 in the second display unit 140. The same processing is performed in any key arrangement.

When the tab button 112*b* for "NC FUNCTION" is pressed (Y in S32), the second display processing unit 224 switches the key arrangement to the key arrangement for NC FUNCTION (S34). When the tab button 112*c* for "SET UP" is pressed (Y in S36), the second display processing unit 224 switches the key arrangement to the key arrangement for SET UP (S38). Also in cases of "SPINDLE", "FUNCTION 1", "FUNCTION 2", "FUNCTION 3", "FUNCTION 4", "FUNCTION 5", "FUNCTION 6", and "FUNCTION KEY", the second display processing unit 224 switches the key arrangement to a corresponding key arrangement.

With reference to FIG. 16, when the tab button 112*l* for "APP" is pressed (Y in S50), the active screen acquisition unit 288 acquires the type of an active screen from the operating system 282 (S52). The second display processing unit 224 determines a key arrangement depending on the active screen. When a tool offset screen is active (Y in S54), the second display processing unit 224 performs switching to the key arrangement for tool offset screen (S56). When a workpiece offset screen is active (Y in S58), the second display processing unit 224 performs switching to the key arrangement for workpiece offset screen (S60). When a program running screen is active as illustrated in FIG. 2 (Y in S62), the second display processing unit 224 performs switching to the key arrangement for program running screen (S64). When a program editing screen is active (Y in S66), the second display processing unit 224 performs switching to the key arrangement for program editing screen (S68). After switching to any key arrangement, the process returns to S12 in FIG. 14.

Figure 17:
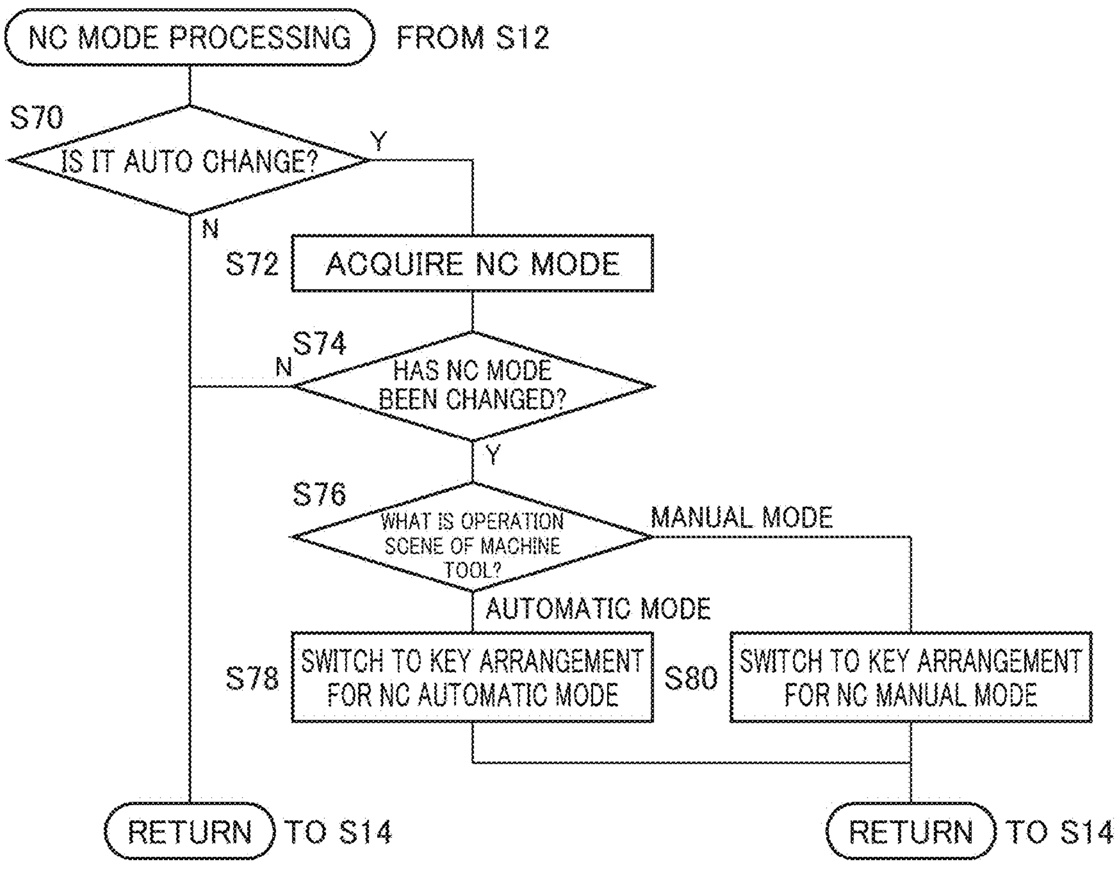
FIG. 17 is a flowchart illustrating a procedure of NC mode processing.

FIG. 17 is a flowchart of the procedure of NC mode processing.

In a case where the tab button 112*a* for "AUTO CHANGE" is selected (Y in S70), processing of S72 and thereafter is performed. In a case where the tab button 112 other than the tab button for "AUTO CHANGE" is selected (N in S70), the process returns to S14 in FIG. 14.

The NC mode acquisition unit 286 acquires an NC mode from the machine tool 100 (S72) and determines whether the NC mode has been changed (S74). In a case where the NC mode has not been changed (N in S74), the process returns to S14 in FIG. 14.

In a case where the NC mode has been changed (Y in S74), the second display processing unit 224 determines a key arrangement depending on the changed NC mode, that is, an operation scene of the machine tool 100 (S76). In a case where the operation scene of the machine tool 100 is an automatic mode (a memory mode, a manual data input mode, or an edit mode), the second display processing unit 224 switches the key arrangement to the key arrangement for NC automatic mode (S78). Meanwhile, in a case where the operation scene of the machine tool 100 is a manual mode (a jog mode, a zero return mode, or a handle mode), the second display processing unit 224 switches the key arrangement to the key arrangement for NC manual mode (S80). The process then returns to S14 in FIG. 14.

Figure 18:
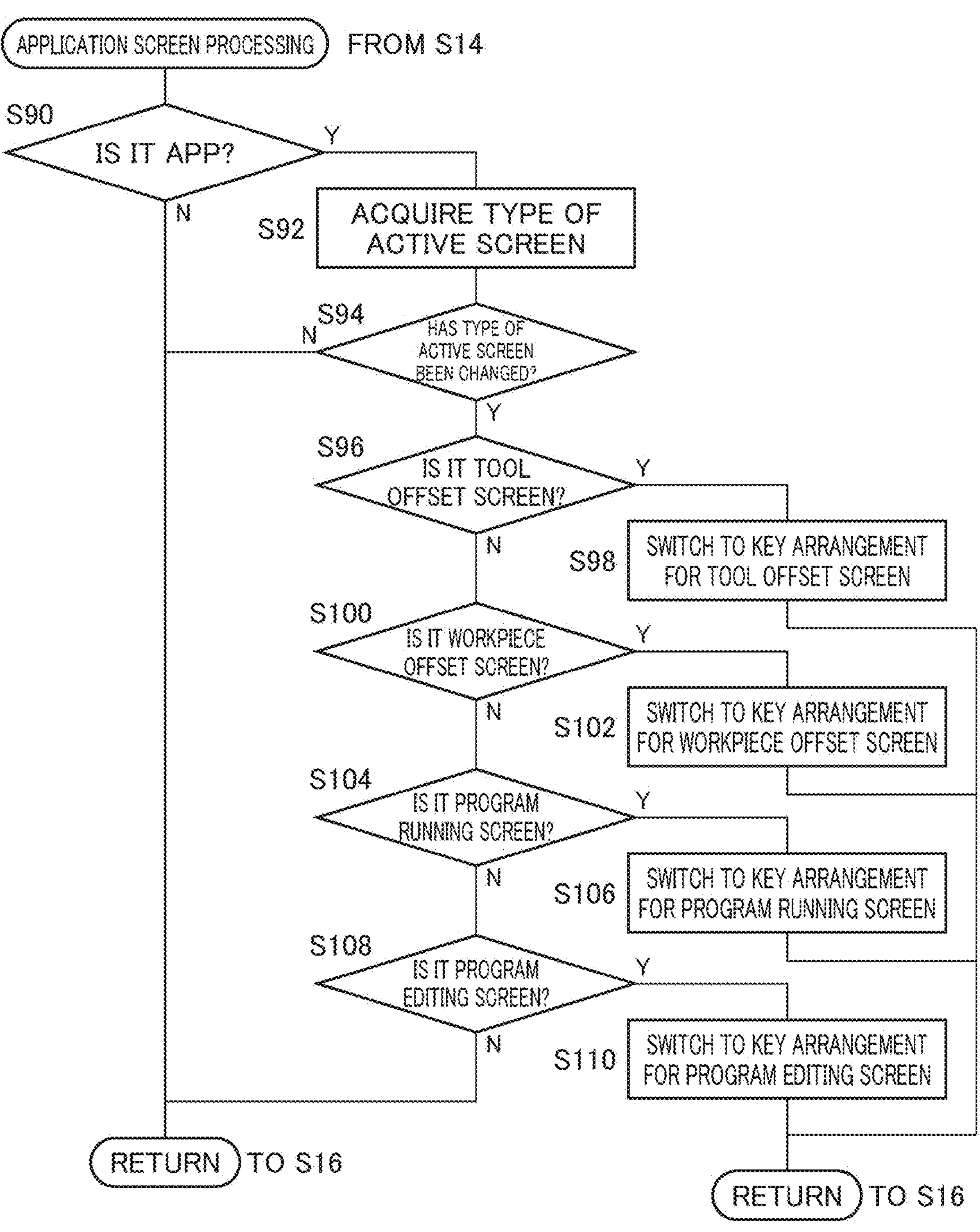
FIG. 18 is a flowchart illustrating a procedure of application screen processing.

FIG. 18 is a flowchart of the procedure of application screen processing.

In a case where the tab button 112*l* for "APP" is selected (Y in S90), processing of S92 and thereafter is performed. In a case where the tab button 112 other than the tab button for "APP" is selected (N in S90), the process returns to S16 in FIG. 14. The active screen acquisition unit 288 acquires the type of an active screen from the operating system 282 (S92) and determines whether the active screen has been changed (S94). In a case where the active screen has not been changed (N in S94), the process returns to S16 in FIG. 14.

In a case where the active screen has been changed (Y in S94), the second display processing unit 224 determines a key arrangement depending on the changed active screen. When a tool offset screen becomes active (Y in S96), the second display processing unit 224 performs switching to the key arrangement for tool offset screen (S98). When a workpiece offset screen becomes active (Y in S100), the second display processing unit 224 performs switching to the key arrangement for workpiece offset screen (S102). When a program running screen becomes active (Y in S104), the second display processing unit 224 performs switching to the key arrangement for program running screen (S106). When a program editing screen becomes active (Y in S108), the second display processing unit 224 performs switching to the key arrangement for program editing screen (S110). After switching to any key arrangement, the process returns to S16 in FIG. 14.

Figure 19:
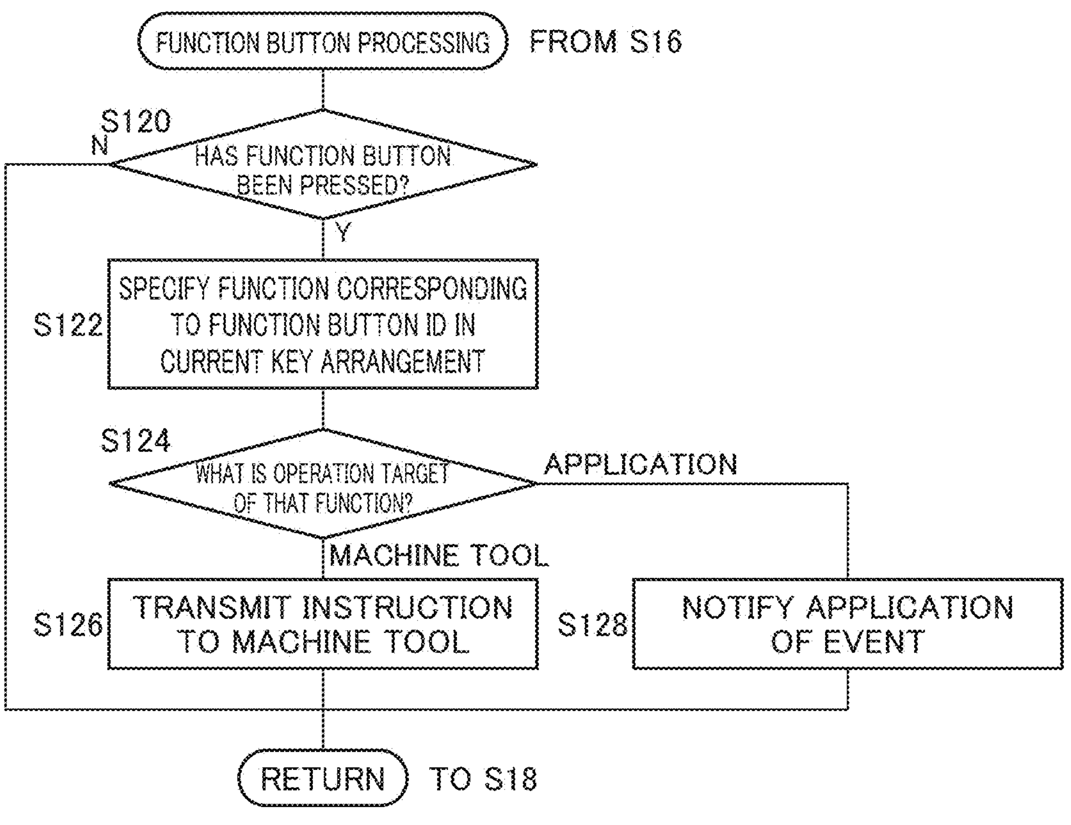
FIG. 19 is a flowchart illustrating a procedure of function button processing.

FIG. 19 is a flowchart of the procedure of function button processing.

When the second accepting unit 214 detects pressing of any function button 110 (Y in S120), processing of S122 and thereafter is performed. When the second accepting unit 214 does not detect pressing of any function button 110 (N in S120), the process returns to S18 in FIG. 14.

The second accepting unit 214 specifies a function corresponding to a pressed function button ID in a current key arrangement (S122). The second accepting unit 214 determines whether an operation target of the function is the machine tool 100 or the application 284 (S124). When the operation target of the function is the machine tool 100, the instruction transmission unit 262 transmits an instruction of the function to the machine tool 100 (S126). The machine tool 100 executes the received instruction. Meanwhile, when the operation target of the function is the application 284, the event notification unit 290 notifies the application 284 of an event of the function (S128). The application 284 that has accepted the notification performs processing in accordance with the event. The process then returns to S18 in FIG. 14.

<First Modification>

The operation panel 102 may recommend a function that has been frequently used in an application screen on the basis of a use history (use record) of each function by a user. The content of recommendation is different depending on the function that each user prefers. Therefore, use histories of functions are managed for each user, and a function to be recommended to each user is selected. This recommendation method enables a key arrangement to be adjusted so as to increase opportunities of using the function buttons 110 in accordance with the way of using the function buttons 110 by the user.

FIG. 20 is a data structure diagram of the use history memory 238.

The use history memory 238 memorizes the illustrated table for each user. As described above, this table is associated with a user ID. The user ID for identifying an operating user is specified, for example, when the user logs in.

In this table, relevant keywords are preset for each function. The relation between the function and the relevant keywords is common to all users. The relevant keyword indicates a characteristic strongly related to the function. In this example, “measurement”, “tool”, “offset”, “shape”, and “friction” are associated with the function “PSM” (presetter mode (ON/OFF)) as relevant keywords. Further, the number of times the user has used the function is memorized. The number of times of use memorized here is a total number of times of use in any key arrangement. In this example, the function button 110 to which the function “PSM” (presetter mode (ON/OFF)) is assigned has been used 52 times in total.

FIG. 21 is a data structure diagram of the screen keyword memory 240.

In the screen keyword memory 240, relevant keywords corresponding to the type of an application screen are preset. The relevant keyword indicates a characteristic strongly related to the application. In this example, “tool”, “offset”, “shape”, “wear”, “measurement”, and “interference” are associated with a tool offset screen as relevant keywords.

The function recommendation unit 294 selects a function to be recommended for each application screen on the basis of the number of times of use. Specifically, data of the use history memory 238 corresponding to a user specified by user authentication is referred to. The function recommendation unit 294 selects a function for which a relevant keyword matching a relevant keyword set for the application screen is set. The function recommendation unit 294 may give priority to a function having a larger number of matching relevant keywords. Further, when the number of matching relevant keywords is equal for some functions, the function recommendation unit 294 may give priority to one of the functions that has a larger number of times of use. Alternatively, the function recommendation unit 294 may calculate an evaluation value on the basis of both the number of matching relevant keywords and the number of times of use, and select functions in descending order of the evaluation value. For example, the evaluation value may be a product of the number of matching relevant keywords and the number of times of use.

The function recommendation unit 294 may present the function to be recommended to the user, and update a key arrangement after obtaining user's approval. For example, a key image indicating the function to be recommended may be displayed on any of the function buttons 110, thereby asking whether to approve addition or replacement. For example, the key image may be blinked for a certain period of time, it may be determined that the key image is approved if the Enter key is pressed while the key image is blinking, and the key arrangement may be updated in such a manner that the function to be recommended is assigned to the function button.

The function recommendation unit 294 may omit the process of obtaining the user's approval and automatically update the key arrangement to include the function to be recommended.

A function to be used may differ depending on the content of an operation performed by a user. However, according to the first modification, it is easy to realize a key arrangement in accordance with an operation frequently performed by the user. Therefore, the function buttons 110 can be effectively used. For example, in a case of a user who frequently edits an NC program, there is an opportunity that a function related to editing of the NC program is recommended and added to the key arrangement.

<Second Modification>

It is permissible that a key arrangement is customized by a user. This configuration makes it easier for the user to use the function buttons 110 and improves usability.

Figure 22:
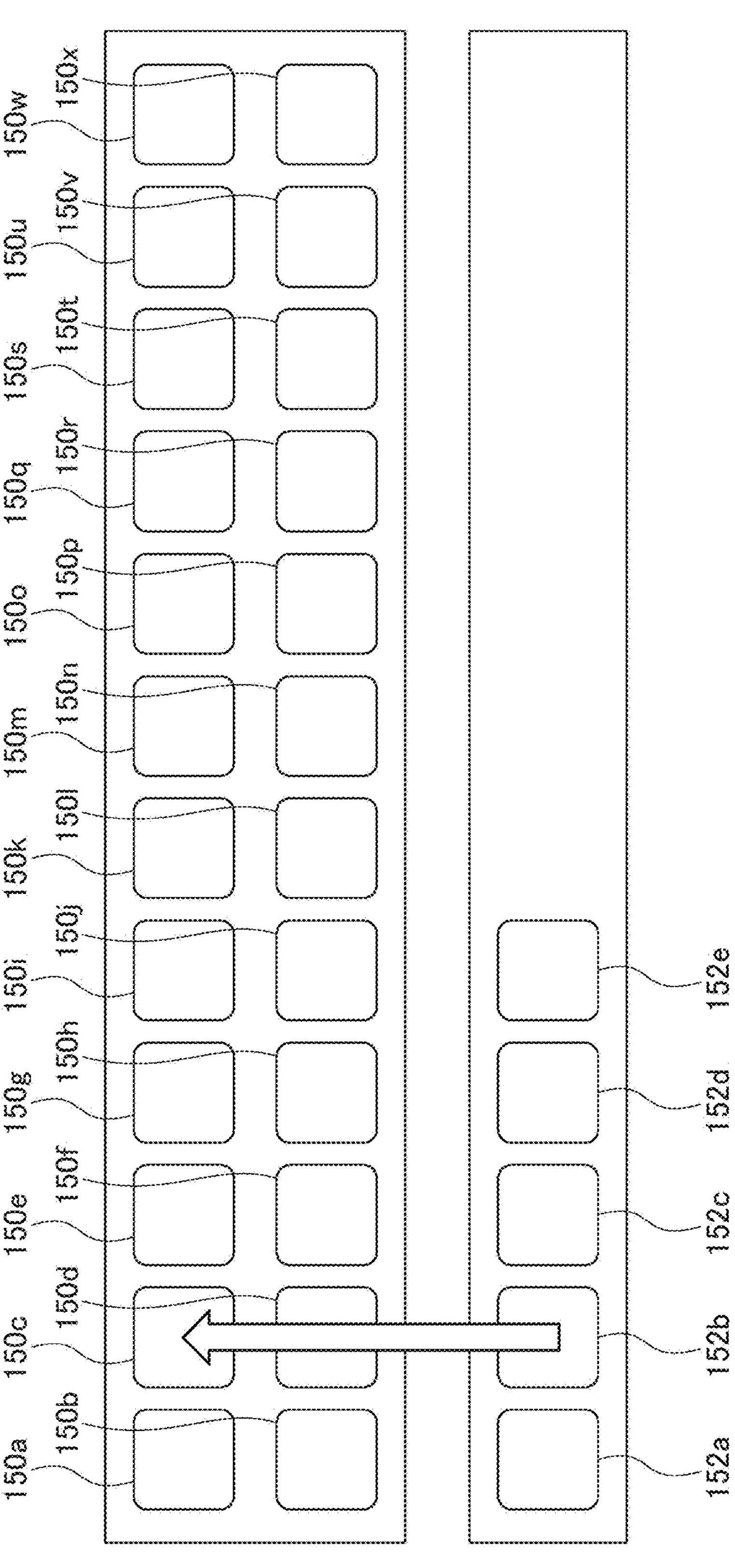
FIG. 22 is a diagram illustrating a key arrangement editing screen.

FIG. 22 is a diagram illustrating a key arrangement editing screen.

The key arrangement editing screen is displayed on the first display unit 104 when a user customizes a key arrangement. Only a specific key arrangement (for example, the key arrangement for FUNCTION 6) may be editable, or all key arrangements may be editable.

A region indicating a key arrangement to be edited is provided in an upper portion of the key arrangement editing screen. A key image indicating a function defined in the key arrangement is displayed in a current function button region 150. A region indicating a function as a candidate for replacement is provided in a lower portion of the key arrangement editing screen. The candidate function is displayed as a key image in a candidate function button region 152. The candidate function may be selected by the above-described recommendation, or may be freely selected by a user by turning key-image list pages.

As indicated by an arrow in FIG. 22, the user touches a candidate function button region 152*b* indicating a candidate function to be added to the key arrangement, and performs a slide operation to a current function button region 150*c* at a position where the candidate function is to be placed. Accordingly, the key image that has been displayed in the candidate function button region 152*b* is displayed in the current function button region 150*c* that is the destination of the slide operation. The definition of the key arrangement is also updated. Specifically, the candidate function of the touched candidate function button region 152*b* is memorized in association with the function button 110*c* corresponding to the destination of the slide operation. A key image that has been set in the destination of the slide operation may be moved to the candidate function button region 152. That is, when a touch operation and a slide operation are performed, a key image that has been displayed in any candidate function button region 152 is replaced with a key image that has been displayed in any current function button region 150.

Functions in the current function button regions 150 may be replaced with each other by identical operation methods. In this case, the definition of the key arrangement is updated in such a manner that a function corresponding to a function button as the start of the slide operation is replaced with a function corresponding to a function button as the destination of the slide operation. The definition of the key arrangement is set for each user in association with a user ID.

<Third Modification>

A key arrangement may be automatically determined depending on the type or the specification of the machine tool 100 to which the operation panel 102 is connected. By employing this determination technique, the function buttons 110 can be effectively used in accordance with functions used in the machine tool 100.

For example, the key arrangement for program running screen for a turning center and the key arrangement for program running screen for a machining center may be defined separately from each other, and either of the key arrangement for program running screen for the turning center and the key arrangement for program running screen for the machining center may be selected and used depending on model information acquired from the machine tool 100. Further, the number of the function buttons 110 for "SPINDLE" (spindle selection) may be increased or decreased in accordance with the number of spindles included in the machine tool 100, for example.

<Fourth Modification>

An example of using tactile switches as the function buttons 110 and the tab buttons 112 has been described in the embodiment. However, other switches may be used as the function buttons 110 and the tab buttons 112. For example, a touch sensor may be provided on a surface of each of the function buttons 110 and the tab buttons 112, and when touching is detected, it may be determined that the button has been pressed.

<Fifth Modification>

An example in which the function buttons 110 are provided separately from the keyboard 108 has been described in the embodiment. However, the keyboard 108 may include the function buttons 110 as its portion. That is, the keyboard 108 may include the first button having a surface on which at least one of a character, a number, a symbol, and a figure is displayed and the second button on which at least one of a character, a number, a symbol, and a figure is displayed and which has the second display unit 140, of which a displayed content is switched depending on an application screen displayed on the first display unit 104, and the transparent cover 130*a*. Keys on the keyboard 108 other than the function buttons 110 may be provided with a backlight in such a manner that the character, the number, the symbol, or the figure is illuminated by the backlight.

<Sixth Modification>

The function button 110 may be circular. The function button 110 may also function as an adjusting knob. For example, a ring may be arranged around the circular function button 110, and a rotation angle of the ring may be detected to obtain a volume value.

<Seventh Modification>

The function button 110 may be a multi-stage switch allowing detection of shallow pressing and deep pressing. For example, in the function button 110 to which a function of fixed amount input is assigned, a value of 0.005 may be added to a predetermined parameter in an application screen when shallow pressing is detected, and a value of 0.010 may be added in an identical manner when deep pressing is detected. With this configuration, it is possible to reduce the number of the necessary function buttons 110 and make the operation panel 106 compact, as compared with a case where the function button 110 for fixed amount input (+0.005) and the function button 110 for fixed amount input (+0.010) are separately provided.

<Eighth Modification>

An example where the operation panel 106 is integrated with an arithmetic unit, a memory device, the first display unit 104, and the like that correspond to an information processing device has been described in the embodiment. However, the operation panel 106 may be provided independently. In this case, the operation panel 106 may be connected to the information processing device including the arithmetic unit, the memory device, and the first display unit 104 by USB (Universal Serial Bus) connection, for example.

<Ninth Modification>

The embodiment has described an example in which, in the tab button processing (FIG. 15) and the NC mode processing (FIG. 17), in a case of a memory mode, a manual data input mode, or an edit mode, an NC mode is determined as an automatic mode and switching to the key arrangement for NC automatic mode is performed, and in a case of a jog mode, a zero return mode, or a handle mode, the NC mode is determined as a manual mode and switching to the key arrangement for NC manual mode is performed. However, key arrangements respectively corresponding to the memory mode, the manual data input mode, the edit mode, the jog mode, the zero return mode, and the handle mode may be prepared separately from each other, and switching to the key arrangement corresponding to each mode may be performed.

<Tenth Modification>

Mode selection functions assigned to the function buttons 110*s* to 110*x* has been described as being common to key arrangements in the embodiment. However, in a part of or all the key arrangements, another function that is not common may be assigned to any of or all the function buttons 110*s* to 110*x*. For example, instead of a mode selection function that is not used (or is used less frequently), another function may be assigned, when the number of functions to be assigned to a certain key arrangement is large.

<Eleventh Modification>

When a specific screen is active, the key arrangement may be changed according to an NC mode. That is, the key arrangement may be determined by a combination of the type of an active screen and an operation scene. Here, an example is described in which if the NC mode is an automatic mode when a tool offset screen is active, a key arrangement different from that in a manual mode is displayed. It is assumed that in the manual mode, the key arrangement for tool offset screen corresponding to the manual mode, which is identical to the key arrangement for tool offset screen illustrated in FIG. 8, is displayed.

Figure 24:
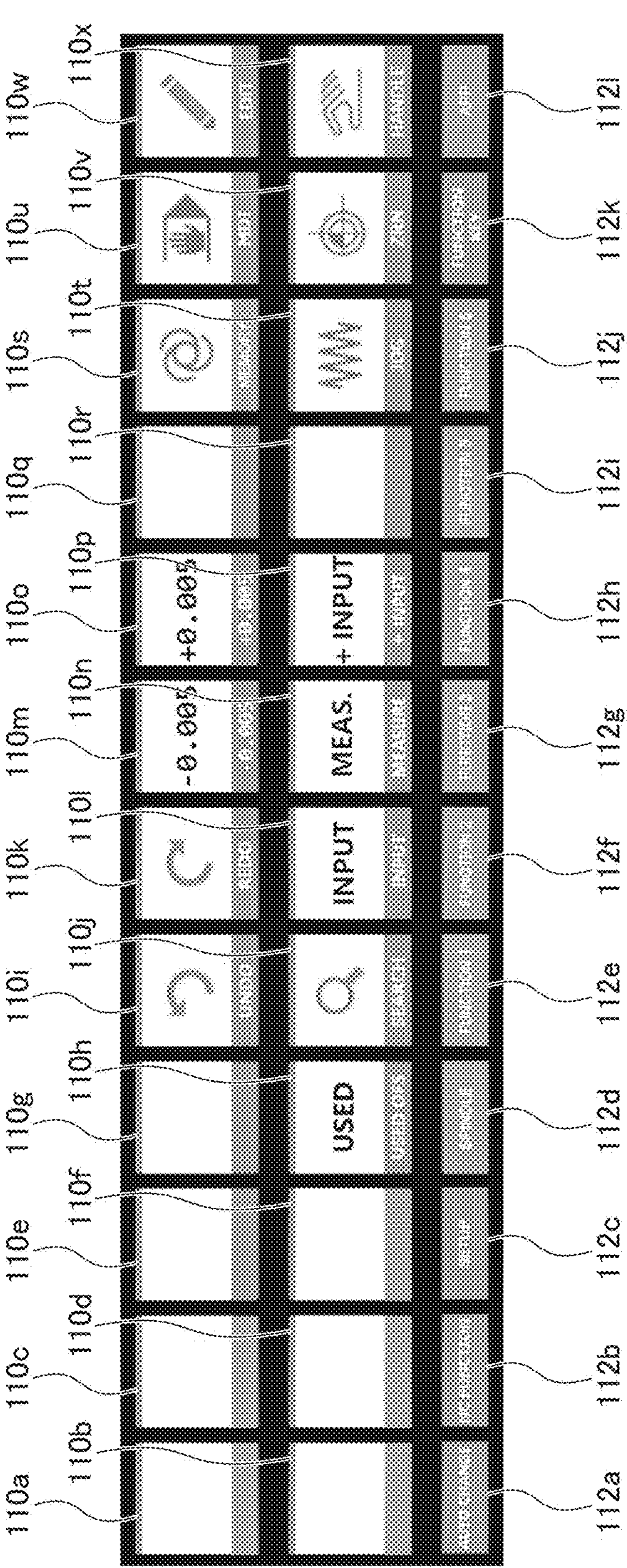
FIG. 24 is a diagram illustrating a display example of a key arrangement for tool offset screen corresponding to an automatic mode.

FIG. 24 is a diagram illustrating a display example of the key arrangement for tool offset screen corresponding to an NC automatic mode.

In a case where an NC mode is an automatic mode, the functions of "TURRET −" (turret turning (−)), "TURRET+" (turret turning (+)), "PSM" (presetter mode (ON/OFF)), "SPINDLE" (spindle selection (main)), and "SPINDLE" (spindle selection (sub)) are omitted, and no function is assigned to the function buttons 110*a*, 110*b*, 110*c*, 110*d*, and 110*f*. This is because these functions are used only when the NC mode is a manual mode. Other functions are identical to those in the case of FIG. 8.

Figure 25:
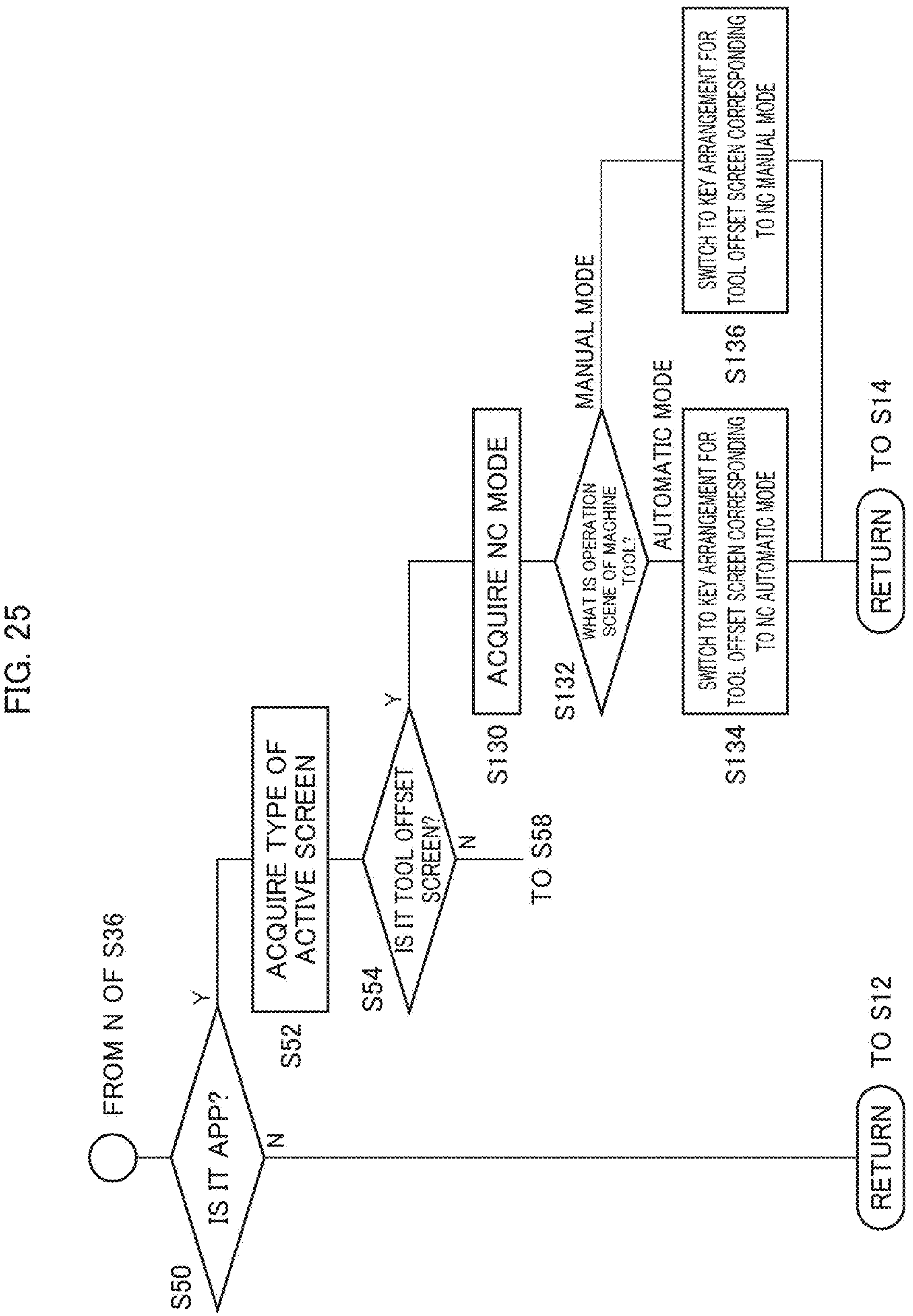
FIG. 25 is a flowchart illustrating a part of a tab button processing procedure according to an eleventh modification.

FIG. 25 is a flowchart illustrating a part of a tab button processing procedure according to the eleventh modification. The processing from S50 to S54 is identical to that in the case of FIG. 16.

When a tool offset screen is active (Y in S54), the NC mode acquisition unit 286 acquires an NC mode from the machine tool 100 (S130). The second display processing unit 224 determines a key arrangement depending on the acquired NC mode, that is, an operation scene of the machine tool 100 (S132). In a case where the operation scene of the machine tool 100 is an automatic mode (a memory mode, a manual data input mode, or an edit mode) ("automatic mode" in S132), the second display processing unit 224 performs switching to the key arrangement for tool offset screen corresponding to an NC automatic mode (FIG. 24) (S134). Meanwhile, in a case where the operation scene of the machine tool 100 is a manual mode (a jog mode, a zero return mode, or a handle mode) ("manual mode" in S132), the second display processing unit 224 performs switching to the key arrangement for tool offset screen corresponding to the manual mode (FIG. 8) (S136).

Similarly, in the application screen processing illustrated in FIG. 18, when the tool offset screen is determined as being active in S96, the NC mode acquisition unit 286 acquires the NC mode from the machine tool 100. The second display processing unit 224 determines the key arrangement depending on the acquired NC mode, that is, the operation scene of the machine tool 100. In a case where the operation scene of the machine tool 100 is an automatic mode (a memory mode, a manual data input mode, or an edit mode), the second display processing unit 224 performs switching to the key arrangement for tool offset screen corresponding to the NC automatic mode (FIG. 24). Meanwhile, in a case where the operation scene of the machine tool 100 is a manual mode (a jog mode, a zero return mode, or a handle mode), the second display processing unit 224 performs switching to the key arrangement for tool offset screen corresponding to the manual mode (FIG. 8).

<Twelfth Modification>

An example in which a plurality of application screens are displayed on the first display unit 104 has been described in the embodiment. However, only one application screen may be displayed on the first display unit 104. In this case, the displayed application screen is active.

Summary

The operation panel 102 for operating a machine tool includes the first display unit 104 that displays information related to the machine tool. As further exemplified in FIG. 4, the operation panel 102 is provided with the function buttons 110 each including the transparent cover 130*a* and allowing change of function assignment in accordance with the situation. The function buttons 110 share the second display unit 140. The function buttons 110 may be provided separately from a keyboard as exemplified in FIG. 3, or may be included as a portion of the keyboard as described in the fifth modification.

As exemplified in FIGS. 6 to 11, when the tab button 112 is pressed, the key arrangement of the function buttons 110 is switched. The second display unit 140 displays, on each function button 110, at least one of a character, a number, a symbol, and a figure that represents a function of the function button 110. In particular, when the tab button 112*l* for "APP" is pressed, key images are switched in accordance with an application screen as exemplified in FIG. 8 (the key arrangement for tool offset screen), FIG. 9 (the key arrangement for workpiece offset screen), FIG. 10 (the key arrangement for program running screen), and FIG. 11 (the key arrangement for program editing screen). This processing has been described in connection with S50 to S68 in FIG. 16.

Also in a case where the active screen is changed in a state where the tab button 112*l* for "APP" is selected, the key arrangement is switched in accordance with an operation screen that has become active. For example, focusing on the function button 110*a* in a state where the tab button 112*l* for "APP" is selected, when a tool offset screen (an example of an application screen) is displayed on the first display unit 104, a key image (an example of the first key image) indicating "TURRET −" (turret turning (−)) (an example of a first function) is displayed as illustrated in FIG. 8. When the application screen displayed on the first display unit 104 is switched to a workpiece offset screen, a key image (an example of the second key image) indicating "PLANE" (workpiece setter (reference plane measurement)) (an example of the second function) is displayed as illustrated in FIG. 9. This processing has been described in connection with S90 to S110 in FIG. 18.

When one application screen is displayed, the displayed screen is active. Therefore, if only the tool offset screen (an example of the application screen) is displayed in the state where the tab button 112*l* for "APP" is selected, the tool offset screen is active. Therefore, the second display unit 140 displays the key image indicating "TURRET −" (turret turning (−)) in accordance with the key arrangement for tool offset screen in FIG. 8 on the function button 110*a* (an example of displaying the first key image corresponding to the application screen on the first button). Similarly, the second display unit 140 displays the key image indicating "TURRET+" (turret turning (+)) in accordance with the key arrangement for tool offset screen on the function button 110*b* (an example of displaying the second key image corresponding to the application screen on the second button).

When a plurality of application screens are displayed, one of the displayed application screens is active. In the example of FIG. 2, the program running screen, the program editing screen, and the tool information screen are displayed, and the program running screen is active. In this case, the second display unit 140 displays 12 key images including the key image indicating "SGL BLOCK" (single block) and the key image indicating "DRY RUN" (dry run) on 12 function buttons including the function buttons 110*a* and 110*b* in accordance with the key arrangement for program running screen (FIG. 10) corresponding to the program running screen that is active (an example in which a plurality of key images including the first key image and the second key image corresponding to an active application screen are displayed on a plurality of buttons including the first and second buttons).

In the eleventh modification, as illustrated in FIG. 25, if an operation scene of a machine tool is an automatic mode ("automatic mode" in S134) when a tool offset screen is active (Y in S54) in a state where the tab button 112*l* for "APP" is selected (Y in S50), the key arrangement is switched to the key arrangement for tool offset screen corresponding to the NC automatic mode (FIG. 24). If the operation scene is a manual mode ("manual mode" in S134), the key arrangement is switched to the key arrangement for tool offset screen corresponding to the NC manual mode (FIG. 8) (an example of switching key images for a plurality of buttons, which are changed in accordance with a displayed application screen, further in accordance with an operation scene of a machine tool).

The embodiment and the modifications have been described as examples of the techniques disclosed in the present application. However, the techniques of the present disclosure are not limited to those and are applicable to other embodiments in which modifications, replacements, additions, or omissions are made thereto as appropriate.

The operation panel and the machine tool described in all the claims of the present disclosure are implemented in cooperation with machine elements as well as hardware resources (such as a processor and a memory) and a program.

This application claims priority to Japanese Patent Application No. 2021-063854 filed on Apr. 5, 2021, which is incorporated herein by reference in its entirety.

The invention claimed is:

1. An operation panel for operating a machine tool, comprising:

a first display displaying information related to the machine tool;

a keyboard including a first button and a second button which are separately formed in buttonholes of a cover; and a second display displaying a key image in a region overlapping with each of the buttonholes in a thickness direction of the operation panel, and the key image being visible through each of the buttonholes, wherein a transparent cover is disposed between the cover and the second display in each of the first button and the second button, and a mechanical detection switch is provided next to each transparent cover of the first button and the second button and outputs a signal when the transparent cover is pressed down by a finger, wherein when a plurality of application screens is displayed on the first display, the second display changes a first key image in a region corresponding to the first button and a second key image in a region corresponding to the second button depending on an active application screen among the plurality of application screens.

2. The operation panel according to claim 1, wherein the keyboard includes a third button which is formed in a buttonhole of the cover and a mechanical detection switch outputting a signal when pressed down by a finger is provided in the third button, the second display displays the first key image corresponding to the application screen displayed on the first display on the second button and displays the second key image corresponding to the application screen on the third button.

3. The operation panel according to claim 1, wherein the keyboard includes a third button which is formed in a buttonhole of the cover and a mechanical detection switch outputting a signal when pressed down by a finger is provided in the third button, the second display displays a plurality of key images including the first key image and the second key image corresponding to the active application screen displayed on the first display on a plurality of buttons including the second button and the third button.

4. A machine tool comprising:

the operation panel according to claim 1; and a machining unit for starting machining when a machining start button on the operation panel is pressed.

5. An operation panel for operating a machine tool, comprising:

a first display displaying information related to the machine tool;

a keyboard;

a plurality of buttons including a first button and a second button which are separately formed in buttonholes of a cover; and a second display displaying a key image in a region overlapping with each of the buttonholes in a thickness direction of the operation panel, and the key image being visible through each of the buttonholes, wherein a transparent cover is disposed between the cover and the second display in each of the first button and the second button, and a mechanical detection switch is provided next to each transparent cover of the first button and the second button and outputs a signal when the transparent cover is pressed down by a finger, wherein when an application screen is displayed on the first display, the second display changes a first key image in a region corresponding to the first button indicating a first function and a second key image in a region corresponding to the second button indicating a second function depending on the application screen.

6. The operation panel according to claim 5, wherein the second display unit displays a first key image corresponding to the application screen displayed on the first display in a region corresponding to the first button and displays a second key image corresponding to the application screen in a region corresponding to the second button.

7. The operation panel according to claim 6, wherein the second display switches the key images in the regions corresponding to the buttons that are changed depending on the displayed application screen, further depending on an operation scene of the machine tool.

8. The operation panel according to claim 5, wherein the first display displays a plurality of application screens, and the second display displays a plurality of key images including the first key image and the second key image corresponding to an active application screen displayed on the first display on the buttons including the first button and the second button.

9. An operation panel for operating a machine tool, comprising:

a first display displaying information related to the machine tool;

a keyboard; and a plurality of buttons including a first button, a second button, and a third button which are separately formed in buttonholes of a cover; and a second display displaying a key image in a region overlapping with each of the buttonholes in a thickness direction of the operation panel, and the key image being visible through each of the buttonholes, wherein a transparent cover is disposed between the cover and the second display, and a mechanical detection switch outputting a signal when pressed down by a finger is provided in each of the first button, the second button, and the third button, wherein the second display displays a first key image indicating a first function in a region corresponding to the first button, displays a second key image indicating a second function in a region corresponding to the second button when the machine tool is in an NC automatic mode including a memory mode, a manual data input mode, and a edit mode, and displays a third key image indicating a third function in a region corresponding to the third button when the machine tool is in an NC manual mode including a jog mode, a zero return mode, and a handle mode.

* * * * *